United States Patent
Misra et al.

(10) Patent No.: US 8,648,008 B2
(45) Date of Patent: *Feb. 11, 2014

(54) ARSENIC ADSORBING COMPOSITION AND METHODS OF USE

(75) Inventors: Manoranjan Misra, Reno, NV (US); Joseph Nanor, Stockton, CA (US)

(73) Assignee: The Board of Regents of the Nevada System of Higher Education, on Behalf of the University of Nevada, Reno, Reno, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/335,633

(22) Filed: Dec. 22, 2011

(65) Prior Publication Data

US 2012/0165181 A1    Jun. 28, 2012

Related U.S. Application Data

(63) Continuation of application No. 11/735,969, filed on Apr. 16, 2007, now Pat. No. 8,110,526.

(60) Provisional application No. 60/792,233, filed on Apr. 14, 2006.

(51) Int. Cl.
    *B01J 20/00*    (2006.01)
    *B01J 20/02*    (2006.01)
    *C02F 1/42*     (2006.01)

(52) U.S. Cl.
    USPC ............ 502/412; 502/400; 502/406; 210/683

(58) Field of Classification Search
    USPC ............... 502/400, 406, 412; 204/157.42; 423/263; 210/683
    See application file for complete search history.

(56) References Cited

U.S. PATENT DOCUMENTS

| | | | |
|---|---|---|---|
| 3,956,118 A | 5/1976 | Kleber et al. | |
| 4,609,537 A | 9/1986 | Tolpin et al. | |
| 4,902,426 A | 2/1990 | Macedo et al. | |
| 5,505,857 A | 4/1996 | Misra et al. | |
| 5,603,838 A | 2/1997 | Misra et al. | |
| 6,197,201 B1 | 3/2001 | Misra et al. | |
| 6,200,482 B1 | 3/2001 | Winchester et al. | |
| 6,551,514 B1 | 4/2003 | Misra et al. | |
| 7,445,718 B2 | 11/2008 | Misra et al. | |

(Continued)

FOREIGN PATENT DOCUMENTS

| | | |
|---|---|---|
| WO | WO 95/19320 | 7/1995 |
| WO | WO 96/37438 | 11/1996 |

(Continued)

OTHER PUBLICATIONS

Arsenic Water Technology Partnership, "2004 Forum," Pilot Demonstration Project, Albuquerque, NM, Oct. 19-20, 2004, 2 pp. (downloaded from the World Wide Web on Jul. 11, 2012).

(Continued)

*Primary Examiner* — Anthony J Zimmer
(74) *Attorney, Agent, or Firm* — Klarquist Sparkman, LLP

(57) ABSTRACT

In various embodiments, the present disclosure provides filtering compositions, their method of production, and methods for their use. In specific implementations, the filtering composition includes lanthanum and has a surface area of at least about 125 g/m². In more specific examples, the filtering composition is free-flowing or has a moisture content between about 10 wt % about 30 wt %. Particular compositions include at least one of iron or magnesium. Some embodiments of the present disclosure provide filtering compositions that are resilient or leach-resistant.

33 Claims, 29 Drawing Sheets

(56) References Cited

U.S. PATENT DOCUMENTS

| | | |
|---|---|---|
| 8,110,526 B2 | 2/2012 | Misra et al. |
| 2006/0030476 A1 | 2/2006 | Lovell et al. |
| 2006/0086670 A1 | 4/2006 | Misra et al. |
| 2008/0308484 A1 | 12/2008 | Deb et al. |
| 2009/0101588 A1 | 4/2009 | Misra et al. |
| 2011/0094969 A1 | 4/2011 | Misra et al. |

FOREIGN PATENT DOCUMENTS

| | | |
|---|---|---|
| WO | WO 00/06502 | 2/2000 |
| WO | WO 03/086564 | 10/2003 |
| WO | WO 2007/047624 | 4/2007 |

OTHER PUBLICATIONS

Arsenic Water Technology Partnership, "2004 Forum Guidelines," Pilot Demonstration Project, Albuquerque, NM, Oct. 19-20, 2004, 1 p. (downloaded from the World Wide Web on Jul. 11, 2012).

Arsenic Water Technology Partnership, "2004 Abstracts & Presentations," Pilot Demonstration Project, Albuquerque, NM, Oct. 19-20, 2004, 2 pp. (downloaded from the World Wide Web on Jul. 11, 2012).

Arsenic Water Technology Partnership, "Participating Vendors," Arsenic Treatment Technology Vendors Forum, Albuquerque, NM, Oct. 19-20, 2004, 1 p. (downloaded from the World Wide Web on Jul. 11, 2012).

EaglePicher, "Lanthanum Enhanced DE Nanocrystalline Media (NXT)," Pilot Demonstration Project, Albuquerque, NM, Oct. 19-20, 2004, 26 pp. (marked Oct. 19, 2004; downloaded from the World Wide Web on Jul. 11, 2012).

Arsenic Water Technology Partnership, "2005 Forum," Pilot Demonstration Project, Albuquerque, NM, Nov. 2-3, 2005, 1 p. (downloaded from the World Wide Web on Jul. 11, 2012).

Arsenic Water Technology Partnership, "2005 Forum Guidelines," Pilot Demonstration Project, Albuquerque, NM, Nov. 2-3, 2005, 2 pp. (downloaded from the World Wide Web on Jul. 11, 2012).

Arsenic Water Technology Partnership, "2005 Vendor Presentations," Pilot Demonstration Project, Albuquerque, NM, Nov. 2-3, 2005, 1 p. (downloaded from the World Wide Web on Jul. 11, 2012).

Arsenic Water Technology Partnership, "Participating Vendors," Arsenic Treatment Technology Vendors Forum, Albuquerque, NM, Nov. 2-3, 2005, 5 pp. (downloaded from the World Wide Web on Jul. 11, 2012).

Arsenic Water Technology Partnership, "Meeting the New Drinking Water Standard for Arsenic," Arsenic Water Treatment Technology Forum, Albuquerque, NM, Nov. 2-3, 2005, 34 pp. (marked Nov. 2, 2005; downloaded from the World Wide Web on Jul. 11, 2012).

EaglePicher, "NXT Nanocrystalline Arsenic Removal Media," Pilot Demonstration Project, Albuquerque, NM, Nov. 2-3, 2005, 14 pp. (marked Nov. 2, 2005; downloaded from the World Wide Web on Jul. 11, 2012).

Davis et al., "Transport Model for the Adsorption of Oxyanions of Selenium (IV) and Arsenic (V) from Water onto Lanthanum and Alumina Oxide," Journal of Colloid and Interface Science, vol. 188, pp. 340-350 (1997).

EaglePicher Filtration & Minerals, Inc., Celaton Diatomaceous Earth Filter Aids Technical Data Sheet.

EaglePicher Filtration & Minerals, Inc., Nanocrystalline, NXT Coagulation/Filtration Arsenic Removal Reagent Technical Data.

EaglePicher Filtration & Minerals, Inc., Products & Services, printed Apr. 14, 2007.

Elias et al., "Surface Reactivity, Cytotoxic, and Morphological Transforming Effects of Diatomaceous Earth Products in Syrian Hamster Embryo Cells," Table 2, Toxicol. Sci., 91(2), 2006, 1 pp.

Howard Garrett, "Diatomaceous Earth is Not All the Same—Natural Organic Home Garden Health," 1pp., downloaded from the World Wide Web on Jul. 21, 2010.

Harper et al., "Removal of Arsenic from Wastewater using Chemical Precipitation Methods", 64(3) Water Environment Research 200-203, 1992.

LANXESS Corp., Bayoxide E33 Material Safety Data Sheet, Apr. 1, 2005.

Lee, Dong Won; International Search Report and Written Opinion for PCT/US2007/009390, dated Sep. 13, 2007.

Lenz, Peter E., Celatom NXT-2 Material Safety Data Sheet, EaglePicher, Inc., Jun. 3, 2005.

Merrill et al., "Field Evaluation of Arsenic and Selenium Removal by Iron Co-precipitation", 6(2) Environmental Progress 82-90, 1987.

Misra et al., "Adsorption and Separation of Arsenic from Process Water Using LS," Proceedings of the Randol Gold Forum'97, pp. 203-206 (1997).

Misra et al., "Adsorption of Oxyanions of Selenium onto Lanthanum Oxide and Alumina," Minor Elements 2000, pp. 345-353 (2000).

Misra et al., "Enhanced Precipitation and Stabilization of Arsenic from Gold Cyanidation Process," Minor Elements 2000, pp. 141-148 (2000).

Nanor et al., "Removal and Stabilization of Arsenic," Proceedings of the Randol Gold and Silver Forum '98, pp. 191-196 (1998).

"NXT-2" product brochure, www.epminerals.com (2007).

Rawat et al., "Adsorption of the Oxyanions of Arsenic onto Lanthanum Oxide," EPD Congress, The Minerals, Metal and Materials Society (TMS), Warrendale, PA, pp. 13-23 (1998).

Siemens, Arsenic Removal with GFH Media, http://www.usfilter.com/en/Product_Lines/General_Filter_Products/General_Filter_Products/Pages/general_filter_gfh.aspx, printed on Dec. 19, 2007.

Wasay et al. "Removal of Arsenite and Arsenate Ions from Aqueous Solution by Basic Yttrium Carbonate," Wat. Res., vol. 30, No. 5, pp. 1143-1148 (1996).

Communication pursuant to Rules 70(2) and 70a(2) EPC dated Aug. 23, 2012, from European Patent Application No. 07775606.2, 1 p.

European Search Opinion dated Aug. 6, 2012, from European Patent Application No. 07775606.2, 10 pp.

European Search Report dated Jul. 30, 2012, from European Patent Application No. 07775606.2, 3 pp.

Examiner's Report dated Mar. 13, 2012, from Canadian Patent Application No. 2,680,402, 3 pp.

Lenz, "NXT Nanocrystalline Arsenic Removal Media," EaglePicher Filtration & Minerals, 14 pp. (marked Nov. 2, 2005).

"Precision Measurement of the Specific Surface Area of Solids by Gas Adsorption," Catalogue of reference procedures, pp. 1-3 (Jan. 2011).

ARSENIC ADSORBING COMPOSITION AND METHODS OF USE

CROSS REFERENCE TO RELATED APPLICATIONS

This application is a continuation of U.S. patent application Ser. No. 11/735,969, filed Apr. 16, 2007, entitled "ARSENIC ADSORBING COMPOSITION AND METHODS OF USE," the disclosure of which is hereby incorporated by reference, which is now U.S. Pat. No. 8,110,526. U.S. patent application Ser. No. 11/735,969 claims the benefit of, and incorporates by reference, U.S. Provisional Patent Application No. 60/792,233, filed Apr. 14, 2006.

TECHNICAL FIELD

The present disclosure relates generally to compositions and methods for purifying solutions. In specific implementations, the present disclosure provides compositions for removing anions, such as arsenic anions, from solutions.

BACKGROUND

Arsenic is a naturally occurring element in the earth's curst and can be found in many natural ecosystems. Mining of arsenic containing ores often releases arsenic into the soil. Burning of arsenic containing fossil fuels, volcanic eruptions, and weathering processes also can introduce substantial amounts of arsenic into the environment. Various industrial activities such as smelting, petroleum refining, pesticide and herbicide manufacturing, and glass and ceramic production can generate arsenic containing wastewater. The presence of arsenic in natural waters may originate from geochemical reactions, industrial waste discharges or agricultural use of pesticides containing arsenic. Arsenic is typically mobile within the environment and may circulate many times in various forms through the atmosphere, water, and soil before finally entering into sediments.

Hyper-pigmentation, skin cancer, liver cancer, circulatory disorders, and other ailments have been attributed to the presence of arsenic in water. The United States Environmental Protection Agency (USEPA) has identified arsenic as a group "A" known carcinogen. This classification is based on sufficient evidence of carcinogenicity from human data involving occupational and drinking water exposures. Arsenic presents a potential health problem due to its toxicity. In response to these health concerns, the USEPA, in January 2001, promulgated the new arsenic rule that lowered the maximum contaminant level (MCL) in drinking water to 10 μg/L (10 ppb) for both community and non-transient, non community water systems. Previously, the Safe Drinking Water Act (SDWA) had a minimum arsenic standard of 50 ppb. The USEPA lowered the standard based on recommendations by the National Research Council, which reviewed scientific studies on the health effects of arsenic on human populations. According to some estimates, conventional water treatment systems will cost the nation between $180 and $725 million to meet the 10 ppb standard set by the USEPA.

Arsenic Chemistry

Arsenic often occurs in inorganic form in aquatic environments, often resulting from the dissolution of solid phases such as arsenolite ($As_2O_3$), arsenic anhydride ($As_2O_5$) and realgar ($AsS_2$). The chemistry of arsenic in aquatic systems is typically complex because the element can be stable in four major oxidation states (+5, +3, 0 and −3) under different redox conditions. In natural waters arsenic is typically found as an anion with acid characteristics in only the As (III) and As (V) oxidation states. In oxygenated waters, the oxyanions of arsenic typically exist in four different arsenate species as $H_3AsO_4$, $H_2A_sO_4^2$ and $A_sO_4^3$ in the pH ranges of <2, 3-6, 8-10 and >12, respectively. Arsenite is more likely to be found in oxygen free (anaerobic) groundwater, while arsenate is more common in aerobic surface water. Arsenite ions are typically oxidized to arsenate in the presence of oxygen, chlorine, or potassium permanganate. Therefore under neutral conditions and acidic conditions, As (III) exists as a neutral species and cannot be adsorbed by an adsorbent based on ionic interaction alone. The chemistry of arsenic is more fully described in U.S. Pat. No. 6,197,201.

Several methods for reducing arsenic concentrations to acceptable levels have been studied and are in current use. These methods include coagulation and precipitation using ferric chloride and sulfate, ion exchange, reverse osmosis, and adsorption using activated carbon and alumina. These methods are effective to a certain extent. However, these methods can be considerably more expensive, and generally narrower in application, than is typically desired for the treatment of large volumes of water. In addition, it can be difficult to implement smaller scale filtration using existing filtering techniques, such as in columns. These difficulties can make it difficult to implement point-of-use or point-of-entry filtration.

The use of ferric chloride, hydrated lime, sodium sulfate and alum to coagulate water-containing arsenic has been described. Harper et al., "Removal of Arsenic from Wastewater using Chemical Precipitation Methods", 64(3) Water Environment Research 200-203, 1992. These methods typically require multiple treatments of water with coagulation chemicals, and large amounts of chemicals relative to the amount of arsenic present, to obtain the desired reduction in arsenic concentration. In addition, the methods typically produce sludge that requires dewatering or solidification and eventually storage in a landfill as hazardous waste. Also, the ferric chloride process typically requires a pH of less than 6.5. Merrill et al., "Field Evaluation of Arsenic and Selenium by Iron Co-precipitation", "6(2) Environmental Progress 82-90, 1987.

A method of precipitating arsenite and arsenate ions from aqueous solutions using yttrium carbonate at alkaline pH has also been described. Wasay et al. "Removal of Arsenite and Arsenate Ions from Aqueous Solution by Basic Yttrium Carbonate", 30(5) Wat. Res. 1143-1148, 1996. This method typically requires strict control of pH to achieve arsenic removal sufficient to comply with environmental standards. In addition, the effective pH range was found to depend on which arsenic species was desired to be precipitated.

U.S. Pat. No. 3,956,118 purports to disclose a process for removing phosphate ions from wastewater using a rare earth salt. However, the disclosed process appears to be limited to removal of phosphates.

Adsorbents, such as lanthanum oxide and lanthanum-alumina oxide, have been used for removing arsenate and arsenite species from solution, such as described in U.S. Pat. No. 5,603,838. This patent purports to disclose that lanthanum oxide alone, or in conjunction with alumina solids and other oxides, can remove arsenic to low levels (<50 ppb). The adsorption kinetics were stated to be extremely fast compared to other adsorbents such as alumina. Davis et al., "Transport Model for the Adsorption of Oxyanions of Selenium (IV) and Arsenic (V) from water onto Lanthanum and Alumina Oxide", Journal of Colloid and Interface Science, 188, 1997, p. 340-350; Misra et al. "Adsorption of Oxyanions of Selenium onto Lanthanum Oxide and Alumina", Minor Elements 2000, Published by SME, February 2000, pp. 345-353; Misra et al., "Adsorption and Separation of Arsenic from Process Water Using LS™ (Lanthanum-Silica Compound)", Proceedings of the Randol Gold Forum'97, 1997, pp. 203-206; Rawat et al., "Adsorption of the Oxyanions of Arsenic onto Lanthanum Oxide", EPD Congress, The Minerals, Metal and Materials Society (TMS), Warrendale, Pa., 1998, pp. 14-23.

A novel precipitation process developed by Misra et al. (U.S. Pat. No. 6,197,201) uses lanthanum chloride and optionally other salts to selectively co-precipitate arsenite and arsenate from process water. Misra et al., "Enhanced Precipitation and Stabilization of Arsenic from Gold Cyanidation Process", Minor Elements 2000, Published by SME, February 2000, pp. 141-148; Nanor et al., "Removal and Stabilization of Arsenic", Randol Gold Forum, 1999, pg. 191-196; Nanor et al., 1998. U.S. Patent Publication No. 2006/0086670 to Misra et al., describes the use of lanthanum hydroxide compositions to precipitate and remove arsenic from solutions.

General drawbacks of the processes discussed above can include inefficient removal of arsenic to an acceptably low level for drinking water and discharge into ground water, the problem of filtration of precipitated sludge, and fouling of resins and membranes. In addition, once the arsenic species are removed, the solid materials formed must typically be disposed of. The solid materials formed from the above processes also can be susceptible to leaching of the metals at a future time. Although the pre-coat process can remove arsenic from drinking water to below 10 ppb, it typically requires about 10 minutes of contact time to accomplish this. In addition, precipitate build up on the surface of the bed can reduce flow rates and require frequent cleaning or replacement of the bed.

Problems involving transportation, storage, and use of prior filtering compositions can also be encountered. For example, compositions which are maintained in a wet or highly moist state can be difficult to transport or to pack into a column or bed for use.

SUMMARY

Particular embodiments of the present disclosure provide filtering compositions having a comparatively high surface area. In some implementations, the filtering compositions are dry, free-flowing materials. In specific examples, the filtering compositions have a moisture content between about 10% and about 30%. Particular disclosed compositions have a crystalline structure, while other disclosed compositions have an amorphous structure. In specific examples, the compositions are resilient or leach resistant.

In further implementations, the filtering compositions have a surface area of at least about 125 m$^2$/g, such as about 125 m$^2$/g to about 350 m$^2$/g, such as about 150 m$^2$/g to about 250 m$^2$/g. In specific examples, the filtering compositions have a surface area of at least about 175 m$^2$/g, such as about 175 m$^2$/g to about 200 m$^2$/g. In further examples, the filtering compositions have a surface area of at least about 200 m$^2$/g. In yet further implementations, the compositions have a density between about 0.5 g/cc and 1.2 g/cc, such as between about 0.6 g/cc and about 1.0 g/cc.

Particular compositions of the present disclosure include a mixture of lanthanum and at least one other element. In specific examples, the composition includes a mixture of lanthanum and iron or a mixture of lanthanum, iron, and magnesium. In some implementations when lanthanum and iron are used, the molar ratio of iron to lanthanum is about 4:1 to about 1:2, such as about 2:1 to about 1:0. In a specific example, the iron to lanthanum ratio is about 1:1. In some examples where the compositions contain lanthanum-iron-magnesium, the molar ratio may be about 10:1:1 to about 50:5:1. In further examples, the lanthanum-iron-magnesium ratio is about 1:2: 0.05 molar. The compositions are formed, in some examples, by precipitation from a salt solution of the active agents. In a particular example, at least one of the salts is a nitrate salts. In a more particular example, all of the metal salts are supplied as nitrate salts.

In accordance with other embodiments of the present disclosure, the above mixture is combined with a substrate. The substrate, in particular examples, is diatomaceous earth, such as calcined diatomaceous earth. In some implementations, the composition contains up to about 30 percent by weight active agent. Lanthanum and the other elements may be initially provided to the substrate in a variety of forms, such as a solution of a salt of the element. In a particular example, the nitrate salts are used.

Particular embodiments of the present disclosure provide resilient or leach-resistant filtering compositions. Certain compositions have a zeta point of at least about pH 9.0, such as in the range of about pH 9.0 to about pH 10.0, such as between about pH 9.5 to about pH 9.8. Higher zeta points can indicate more resilient or leach resistant compositions.

The present disclosure also provides method for forming filtering compositions. According to a disclosed method, a solution of active agent is added to a precipitating solution. The active agent solution, in more particular examples, is a salt solution of the active agent or agents (or their precursors), such as an acidic salt solution. The precipitating solution may be a basic solution, such as a sodium hydroxide solution. In particular methods, the rate of addition of the active agent solution is controlled such that the temperature of the mixed solution does not exceed a predetermined threshold temperature or temperature change. In particular examples, the temperate of the mixed solution is kept between below about 60° C., such as below about 45° C. In a specific example, the temperature is maintained between about 35° C. and about 45° C. In other embodiments, the basic solution is added to the active agent solution. One or both of the solutions may include a support material.

In yet further embodiments, filtering compositions are prepared by adding the active agent in solid form to a support. In particular examples, the active agent includes at least one of lanthanum hydroxide, lanthanum-iron hydroxide, or lanthanum-iron-magnesium. In yet further embodiments, the active agent is selected from nanocrystals of lanthanum, lanthanum oxy-hydroxide, and/or lanthanum on iron materials, such as lanthanum-ferric oxy-hydroxide and lanthanum-ferric-magnesium oxy-hydroxide.

In conjunction with precipitation of an active agent solution, or addition of a precipitated active agent to a support, mixing can be applied. In some cases, mixing is applied for an additional period of time after the addition is complete, such as an additional 2 hours. In particular examples, agitation is carried out using a standard commercial mixing apparatus operating at about 200 rpm to about 500 rpm, such as about 300 rpm.

In further embodiments, the method of making the filtering composition includes drying the composition formed from mixing the active agent and substrate. In a particular implementation, the composition is dried until it has a water content of about 10% to about 30%. In more particular implementations, the drying process is carried out at relatively low temperatures, such as less than about 200° C., such as between about 60° C. and about 100° C. In particular examples, the drying time is about 12 to about 36 hours, such as about 16 to about 24 hours.

In particular methods of the present disclosure, ultrasonication is applied to the composition after and/or during precipitation of the active agent or addition of the active agent to a support. In particular methods, the composition is ultrasonicated after mixing for a period of about 10 to about 60 minutes at a frequency of about 25 kHz to about 42 kHz. In some implementations, ultrasonication can provide more resilient or leach-resistant compositions.

The present disclosure also provides methods of using the disclosed filtering agents. In particular methods, the filtering agent is placed in a quantity of liquid and added to a column or bed. A solution containing the material to be removed is passes through the column or bed of material and at least a portion of a solute is retained by the filtering composition. In particular examples, the solute is arsenic. In further examples, the solute is one or more of arsenic, tungsten, fluoride, boron, vanadium, phosphate, or bicarbonate.

Particular compositions are suitable for use in point-of-entry/point-of-use systems, such as having suitably fast adsorption kinetics and are able to adsorb a sufficient amount of material to provide a useful system life.

There are additional features and advantages of the subject matter described herein. They will become apparent as this specification proceeds.

In this regard, it is to be understood that this is a brief summary of varying aspects of the subject matter described herein. The various features described in this section and below for various embodiments may be used in combination or separately. Any particular embodiment need not provide all features noted above, nor solve all problems or address all issues in the prior art noted above.

BRIEF DESCRIPTION OF THE DRAWINGS

Various embodiments are shown and described in connection with the following drawings in which.

DETAILED DESCRIPTION

Figure 1:
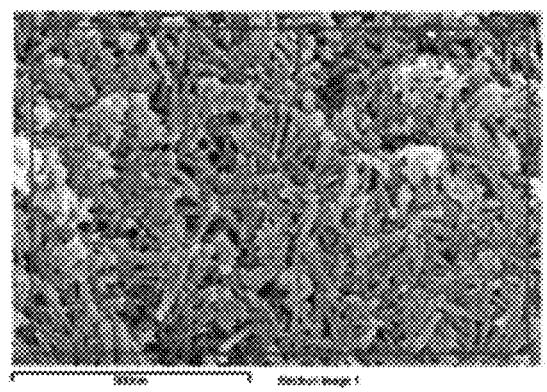
FIG. 1 is a scanning electron micrograph of a disclosed lanthanum hydroxide material.

Unless otherwise explained, all technical and scientific terms used herein have the same meaning as commonly understood by one of ordinary skill in the art to which this disclosure belongs. In case of any such conflict, or a conflict between the present disclosure and any document referred to herein, the present specification, including explanations of terms, will control. The singular terms "a," "an," and "the" include plural referents unless context clearly indicates otherwise. Similarly, the word "or" is intended to include "and" unless the context clearly indicates otherwise. The term "comprising" means "including;" hence, "comprising A or B" means including A or B, as well as A and B together. All numerical ranges given herein include all values, including end values (unless specifically excluded) and intermediate ranges.

Although methods and materials similar or equivalent to those described herein can be used in the practice or testing of the present disclosure, suitable methods and materials are described herein. The disclosed materials, methods, and examples are illustrative only and not intended to be limiting.

As used herein, "removing" means the concentration of one or more substances in a solution is reduced to a desired level. For example, "removing arsenic from arsenic-containing water" means reducing the concentration of arsenic, such as in the form of arsenite and arsenate, in arsenic-containing water to a desired level, such as to a concentration below about 10 ppb, such as below about 5 ppb.

"Arsenic-containing water" may contain elements in addition to arsenic.

"Aqueous solution" refers to a solution in which water is a dissolving medium or solvent. The pH of the aqueous solution may be adjusted by any means known by those of ordinary skill in the art, including by the addition of magnesium oxide, calcium hydroxide, and/or sodium hydroxide to raise the pH, and the addition of hydrochloric acid or other inorganic acids to lower the pH.

"Adsorbent," "adsorbing composition," or "filtering composition" refer to a material that physically or chemically removes one or more substances of interest, such as ions, from a solution, such as an aqueous solution. "Active agent" refers to one or more materials in an adsorbing composition which actively remove the substances from solution while "substrate" or "support" refers to a comparatively inert material, or a mixture of such materials, on which the active agent is disposed or with which the active agent is mixed. Certain of the disclosed compositions include only active agents while others include both active agents and a support. In particular examples, the active agent is prepared from a metal salt, such as a nitrate salt, sulfate, carbonate, or chloride salt.

"Solid materials," such as those formed from the action of an adsorbent, include amorphous materials and crystalline materials or mixtures.

"Lanthanum chloride" refers to both pure and impure lanthanum chloride. Impure lanthanum chloride can contain various elements of the lanthanide series in addition to lanthanum. The lanthanide series of elements includes the elements lanthanum, cerium, praseodymium, and neodymium.

Certain active agents disclosed herein are "metal salt hydroxides," hydroxides formed from one or more metal salts. Metal salt hydroxides can be added already in the hydroxide form or can be converted to the hydroxide form, such as by precipitation from a salt solution using a base, lime, or magnesium oxide, as known in the art. Suitable salts useable to prepare metal hydroxides include nitrate, sulfate, chloride, and carbonate salts.

As used herein, "contacting" means placing two or more substances, such as arsenic-containing water and a filtering composition, together so that a desired reaction occurs to a desired extent.

"Resilient," as used herein, means that a filtering composition resists being broken down into smaller particles. For example, nanocrystalline compositions may be more resilient than amorphous compositions otherwise having similar properties or chemical composition. The present disclosure provides methods for making such resilient compositions. Resilient compositions may provide other benefits, such as resisting leaching of absorbed materials.

"Leach resistant," as used herein, refers to a material being resistant to chemical or physical removal of absorbed species as compared with another material. For example, for adsorbent compositions, a material is considered "leach resistant" with respect to another material if it loses less of an absorbed material, such as arsenic ions, over equivalent periods of time or exposure, such as during passage of a liquid through the material or storage of the material, such as in a landfill. Leach resistant can also mean that a composition satisfies a particular test or meets or exceeds a particular standard.

In specific examples, leach resistance can be correlated with the zeta potential and zeta point of a composition. For example, in arsenic absorption applications, the zeta point, or point at which the composition has a zero zeta potential, can indicate the point at which arsenic is no longer absorbed. Particular disclosed compositions have a zeta point of at least about pH 9.0, such as in the range of about pH 9.0 to about pH 10.0. In specific examples, the compositions have a zeta point in the range of about pH 9.5 to about pH 9.8.

In particular embodiments, the present disclosure provides filtering compositions which include lanthanum hydroxide. The lanthanum used to produce disclosed filtering compositions can be pure or can be mixed with other elements of the lanthanide series. Lanthanum hydroxide can also be used in combination with other metals such as ferric hydroxide, ferric nitrate, magnesium hydroxide, magnesium oxide, and magnesium nitrate. Certain embodiments combine magnesium oxide, iron chloride and lanthanum chloride at various ratios, which, under certain disclosed conditions, form nanocrystalline oxy-hydroxide media. Further embodiments combine lanthanum nitrate and ferric nitrate at various ratios. Yet further embodiments combine lanthanum carbonate and iron powder at various ratios, including in the presence of nitric acid, in particular implementations.

The lanthanum containing compositions are mixed with a support material. Suitable supports for the disclosed filtering compositions form porous structures and adsorb the disclosed active agents. Suitable supports include diatomaceous earth, including calcined diatomaceous earth, cellulose, and perlite, and mixtures thereof. In particular examples, the support has a size of between about 20 and about 270 mesh, such as between about 30 and about 60 mesh. Suitable support materials are available from EP Minerals, LLC, of Reno, Nev.

In particular implementations, the active agent includes a mixture of lanthanum and at least one other element, such as iron or magnesium. Suitable lanthanum and iron sources include salts of the metals, such as chloride, sulfate, carbonate, or nitrate salts. In specific examples, the active agent has a molar ratio of iron to lanthanum of about 4:1 to about 1:2, such as from about 2:1. In a specific example, the active agent has a lanthanum to iron ratio of at least about 10:1. In more specific examples, the ratio of iron to lanthanum is about 1:1. Further examples include both iron and magnesium, such as from a magnesium oxide source, such as in a molar ratio of lanthanum-iron-magnesium of about 10:1:0.1 to about 50:5:0.05. In further embodiments, the molar ratio may be from about 1:1:0.9 to about 1:4:0.1 iron to lanthanum to magnesium. In a more particular example, the molar ratio is about 1:1.5:0.1 iron:lanthanum:magnesium.

For the removal of arsenic ions, in particular embodiments, a lanthanum hydroxide media includes from about 10 to about 5000 moles of lanthanum for every mole of arsenic ions in solution. Lanthanum-iron-magnesium compositions typically have about 10 to about 5000 moles of lanthanum, about 1 mole to about 500 moles iron, and about 1 to about 100 moles of magnesium for each mole of arsenic ions in a solution to be filtered.

The present disclosure provides compositions have a comparatively high surface area and methods for their production. For example, disclosed compositions can be produced with a surface area of about 125 $m^2/g$ to about 350 $m^2/g$, such as about 150 $m^2/g$ to about 250 $m^2g$. In more specific examples, the compositions have a surface area of about 175 $m^2/g$ to about 200 $m^2/g$. Compositions having higher surface areas can allow the compositions to absorb materials more quickly or absorb a greater amount of material compared with materials with lower surface areas.

In particular embodiments, the density of the disclosed composition provides desired physical properties, such as for packing a column or bed. Insufficiently dense compositions may not settle properly or can be easily disturbed by turbulence. Too dense compositions may not provide a sufficient flow rate or be sufficiently porous. The density of the composition may be adjusted through various means, such as the ratio of active agent materials, the amount of support material, the support material composition, or the physical priorities, such as the mesh size, of the support material. In particular embodiments, the compositions have a density of between about 0.5 g/cc and about 1.2 g/cc, such as about 0.6 g/cc and about 1.0 g/cc.

Suitable compositions can be prepared by mixing a solution of the active agent (or its precursors) with a base, such as sodium hydroxide, thus precipitating a hydroxide, such as a hydroxide gel, of the active agent. The active agent solution is typically at a comparatively acidic pH, such as a pH of about 1.8. The basic solution typically has a pH of about 9 to about 11, such as a pH 10 solution of NaOH. The pH of the basic solution can be selected, among other things, to control the rate of precipitation or the volume of the resulting solution. In some implementations, the solution of active agent is added to the base, so that the base is in excess.

Particular embodiments of the present disclosure provide resilient or leach-resistant compositions. In a particular example, the rate of addition of the active agent solution to the base, or the base to the active agent solution, can be selected or controlled to influence the properties of the resulting composition. In particular embodiments, the temperature of the mixed solution is monitored and used to control the speed of addition. For example, the rate of addition can be selected so that the temperature of the mixed solution does not exceed 60° C., such as not exceeding about 45° C. In particular examples, the solution is held in the range of 35° C. to 45° C. In embodiments employing solutions above room temperature, the degree of heating of the solution can be used to control the rate of addition. For example, the temperature change can be limited to no more than 20 degrees (such as 20° C.), such as being maintained at a temperature increase of about 10 to about 20 degrees (such as about 10° C. to about 20° C.).

In particular methods, the active agent or basic solution includes a quantity of support material. Typically, to facilitate the addition, the support material is included in the solution to which the other solution is added. In yet further methods of the present disclosure, an active agent is formed, such as described above by precipitating the active agent from a solution of the active agent (or its precursors) in the absence of the support material. The solid active agent may then be mixed with the support material.

The mixture is typically agitated during addition and for a period of time after addition is complete, such as about an additional 2 hours. Agitation may be accomplished using standard commercial mixing apparatus, which can be selected based on the amount of the disclosed compositions being prepared. In at least certain embodiments, the mixer is a blade or paddle type mixer operating at about 200-500 rpm, such as about 300 rpm.

In particular embodiments, the composition is ultrasonicated during and/or after addition of the active agent and base solutions, or the addition of the active agent material to the support material. Ultrasonication may be accomplished using standard bath or probe (immersion) ultrasonication devices, which typically operate at a frequency of 25 kHz to about 42 kHz. Sonication is typically applied after precipitation of the iron and lanthanum species is complete and is typically applied for a period of about 10 minutes to about 60 minutes, although longer periods can be used. Longer sonication periods are typically used with higher frequency sonication. Visual inspection of the composition can be used, in at least certain embodiments, to determine when the composition has been sufficiently sonicated, as the composition typically achieves a uniformly mixed appearance. Ultrasonication of the composition can result in improved characteristics, such as composition resilience or leach-resistance. Stronger or more resilient material can make the compositions easier to use, such as by withstanding turbulence when a fluid is passed through a bed of the composition.

The amount of active agent in the active agent solution, or the amount of active agent material added to the support material, can be selected to provide a desired amount of active agent in the final composition. For example, in some instances the support material incorporates a maximum of about 30 wt % of the active agent with which it is mixed. In further examples, the support material incorporates at least about 1 wt % of the active agent, such as between about 2 wt % and about 10 wt %. The amount of active agent included in a composition with a support material can be selected to provide a desired operational life, including based on the solute concentration expected in a particular application, as well as the desired flow rate, contact time, and bed length.

After the composition has been mixed and subjected to any desired post-mixing steps, including washing to remove salts, fine, or active agent not-adhered to a support, or screening, it may be dried, such as for storage or manipulation. Any remaining liquid from the mixing process is typically removed, such as by decantation, filtration, or suction, and the cake of material dried. Drying is typically carried out such that the finial composition contains about 10 wt % to about 30 wt % water. Although higher and lower percentages can be used, higher percentages of water may result in sticky compositions that are difficult to manipulate.

Particular drying conditions may vary based on the volume and thickness of material to be dried. In order to prevent damage to the material, and help provide even drying, the composition are dried, in some examples, at relatively low temperatures, such as less than about 200° C. In more particular examples, the compositions are dried between about 60° C. and about 100° C. Drying times are typically between about 5 and about 36 hours, such about 12 to about 20 hours. The material can be dried by any suitable process, including by heating the mixture in an oven or passing a stream of heated air over the material.

The presently disclosed compositions may be used in a variety of filtration applications. More particularly, the disclosed compositions can be used to remove unwanted species, from solution. The present compositions can be used to remove a number of species, including arsenic, tungsten, fluoride, bicarbonate, phosphate, vanadium, and boron.

Use of Disclosed Adsorbents

Solutions containing arsenic ions are contacted with the filtering composition. The solution typically remains in contact with the filtering compositions for a period of time sufficient to remove a solute, such as arsenic ions, to a desired concentration range. In particular examples, about 1 to about 10 minutes, such as about 1 to about 5 minutes, is sufficient to remove arsenic to the desired concentration, such as below about 10 ppb, when the concentration of arsenic in solution is between about 5 and about 100,000 ppb.

Disclosed processes can be used to remove more than 99% of arsenic species from aqueous solution. In more particular implementations, concentrations of less than 5 ppb arsenic are achievable. In particular implementations, adjustment of the solution pH is not required prior to passage through the filtering composition. Particular disclosed adsorbents are effective over a wide pH range, such as from about 4.0 to about 10.0, such as about 5.0 to about 9.5.

The water to be treated may come from any suitable sources. Particular source waters include raw water, well water, drinking water (chlorinated or not), and process water. In particular examples of such processes, the metal salt hydroxides include lanthanum or iron-lanthanum-magnesium, such as iron-lanthanum-magnesium having a weight ratio between about 1:1:0.8 and about 1:4:0.2.

In particular disclosed methods, the adsorbents are stable or leach resistant after removing arsenic. In more particular methods, such absorbents pass both the California Wet Test and the Toxicity Characteristics Leaching Procedure (TCLP). The filtering compositions may be wet screened and washed before loading into a column or bed.

EXAMPLE 1

Preparation of Filtering Compositions

Preparation of Lanthanum Hydroxide Media (DE-LaH)

The procedure for preparing this composition was similar to the preparation of media "G" in U.S. Pat. No. 6,200,482 B1, Mar. 13, 2001. In the case of any discrepancy in procedure, the present disclosure shall control.

200 cc of 0.5 M $LaCl_3$ solution was added to 50 g diatomaceous earth (DE) and mixed for 60 minutes. The slurry was allowed to sit for 24 hours, after which the excess solution was decanted. The resulting material was submerged in de-ionized (D.I) water and stirred gently. 10 M NaOH was added dropwise until the pH of the slurry was 10.0. The material was allowed to settle and was filtered. The collected material was washed to remove excess salt. The collected material was dried at different temperatures.

Preparation of De-lanthanum-Iron Hydroxide Media (DE-LFH)

The procedure for preparing this composition was similar to the preparation of media "G" in U.S. Pat. No. 6,200,482. In the case of any discrepancy in procedure, the present disclosure shall control. 200 cc of 0.5 M $LaCl_3$ and 0.5 M $FeCl_3$ cocktail solution, prepared by dissolving lanthanum chloride or lanthanum carbonate in ferric chloride solution, was added to 50 g diatomaceous earth and mixed for 60 minutes. The resulting slurry was allowed to sit for 24 hours, and the excess solution was decanted. The material was submerged in de-ionized water and stirred gently. Next, 10 M NaOH was added dropwise until the pH of the slurry was 10.0. The material was then allowed to settle and filtered. The collected material was washed to remove excess salt and then dried at different temperatures.

Preparation of Lanthanum Hydroxide Media (LaH)

Nanocrystals of lanthanum hydroxide adsorption media were prepared by dissolving lanthanum salts, such as lanthanum chloride, lanthanum acetate in water, lanthanum nitrate, or lanthanum carbonate, in hydrochloric acid, followed by precipitation with sodium hydroxide at pH 10.0. The precipitate was filtered out and air was passed through it, then the material was allowed to sit for 24 hours. The material was dried at different temperatures ranging from about 25° to about 350° C. The dried material was crushed and wet screened for the appropriate size. The material was washed to remove any residual sodium chloride salt. A scanning electron micrograph of a LaH oxy-hydroxide is shown in FIG. 1.

Preparation of Lanthanum-Iron-Magnesium Hydroxide Media (LFM)

Nanocrystals of lanthanum-iron-magnesium hydroxide composition were prepared by dissolving lanthanum salts, such as lanthanum chloride, lanthanum acetate, lanthanum nitrate, or lanthanum carbonate, and magnesium oxide in ferric chloride or ferric nitrate solution, then co-precipitating the hydroxides with sodium hydroxide at pH 9.0. Magnesium oxide was added to raise the pH to 10.0. The precipitate was filtered out and air was passed through it, then the material was allowed to sit for 24 hours. The material was dried at different temperatures ranging from 25° to 250° C. The dried material was crushed and wet screened for the appropriate size. The material was washed to remove any residual sodium chloride salt.

Figure 2:
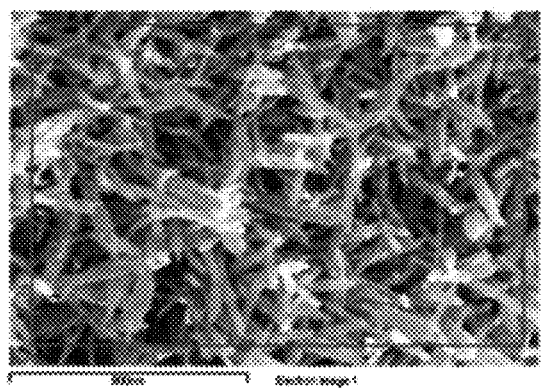
FIG. 2 is a scanning electron micrograph of a disclosed lanthanum-iron-magnesium hydroxide material.

The filtration of the precipitates can be accomplished with a centrifuge or a press belt filter, but any suitable process known in the art can be used. A scanning electron micrograph of a LFM oxy-hydroxide is shown in FIG. 2.

The properties of certain adsorbents prepared as described in the present Example are summarized in Tables 1 and 2, below.

TABLE 1

Characteristics of DE-LF and DE-LaH Materials

| Media | Bulk Density (g/cc) | Particle Size (mesh) | % Loading of Active Reagent onto DE |
|---|---|---|---|
| DE-LF | 0.44 | 10-32 | 30 |
|  |  | 32-100 | 30 |
| DE-LaH | 0.45 | 10-32 | 30 |
|  |  | 32-100 | 30 |

TABLE 2

Characteristics of LFM and LaH Materials

| Media (drying temperature) | Bulk Density | Particle Size (mesh) | Surface Area (m²/g) | % Composition by Weight (SEM) | | | | |
|---|---|---|---|---|---|---|---|---|
| | | | | La | Fe | Mg | Cl | O |
| LFM (200° C.) | 1.1 | 32-100 | 67.02 | 33.3 | 19 | 5.7 | 6.7 | 33 |
| | | 100-270 | 78.6 | 27 | 20.2 | 5.8 | 3.8 | 40.5 |
| LaH (200° C.) | 1.3 | 32-100 | 68.71 | 57.2 | Nil | Nil | 8.9 | 30.5 |
| | | 100-270 | 82.73 | 56.6 | Nil | Nil | 8.1 | 33.5 |
| LFM with air (60° C.) | 1.0 | 32-100 | 105.6 | 20.0 | 16.0 | 4.1 | 3.0 | 46.0 |
| | | 100-270 | 123.5 | 15.0 | 14.0 | 3.0 | 1.0 | 50.5 |

EXAMPLE 2

Removal of Arsenic From Synthetic

Removal With DE-LaH 200 cc of synthetic 150 ppb arsenic solution was added to various amounts of the compositions of Example 1, prepared without passing air but dried at different temperatures, and gently agitated for 4-5 minutes. After 4-5 minutes, the arsenic solution was filtered and the filtrate analyzed for arsenic concentration. The synthetic arsenic solution was prepared by dissolving known amount of chemical grade $Na_2HAsO_4.7H_2O$ in de-ionized water.

Figure 3:
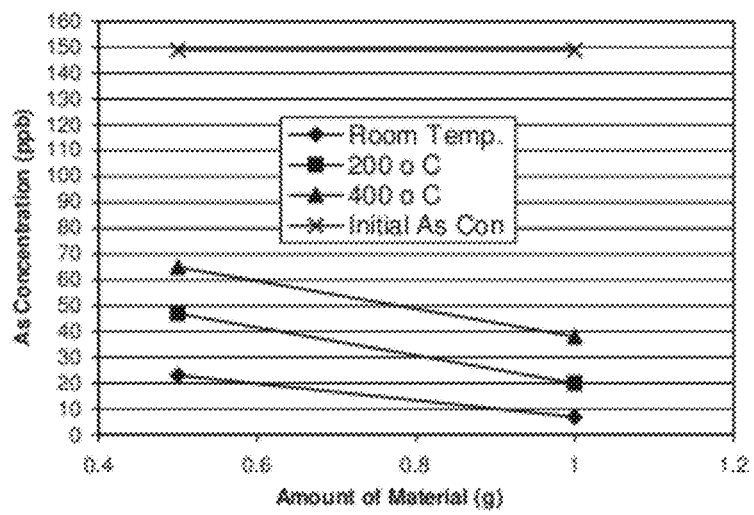
FIG. 3 is a graph showing the effects of temperature and amount of a disclosed LaH filtering composition on arsenic removal.

According to the results shown in FIG. 3, the concentration of arsenic was reduced to below the recommended MCL 10.00 ppb, when 1.0 gram of the adsorbent material air dried at room temperature was used. Drying the adsorbent material at higher temperatures reduces its efficiency to remove arsenic from solution. In addition, using less than 1.0 gram of the adsorbent material was not as effective in removing arsenic to below 10.0 ppb.

Removal With DE-LF and DE-LaH 200 cc of synthetic 150 ppb arsenic solution was added to 1.0 g of the different compositions dried at room temperature and gently agitated for 3-4 minutes. The test was conducted with different sizes of the test materials. After 3-4 minutes, the arsenic solution was filtered and the filtrate analyzed for arsenic concentration. The results of the analysis are given in Table 3 below.

TABLE 3

Removal of Arsenic with DE-LaH and De-LF

| Material | Particle Size (mesh) | pH of Solution | Final As con. (ppb) |
|---|---|---|---|
| DE-La | 10-32 | 8.5 | 5 |
| DE-La | 32-100 | 8.5 | 10 |
| DE-La—Fe | 10-32 | 8.3 | 10 |
| DE-La—Fe | 32-100 | 8.3 | 8 |

From the results in Table 3, diatomaceous earth with LaH or LFM materials are both capable of removing arsenic.

EXAMPLE 3

Rapid Small Scale Column Test (RSSCT) for Removing Arsenic from University of Nevada Reno Tap Water Several RSSCT were performed with the different media described in Example 1. The arsenic contaminated water was prepared by dissolving known amounts of chemical grade $Na_2HAsO_4.7H_2O$ in the tap water. The pH and Eh of the water was measured after the addition of the arsenic.

Figure 4:
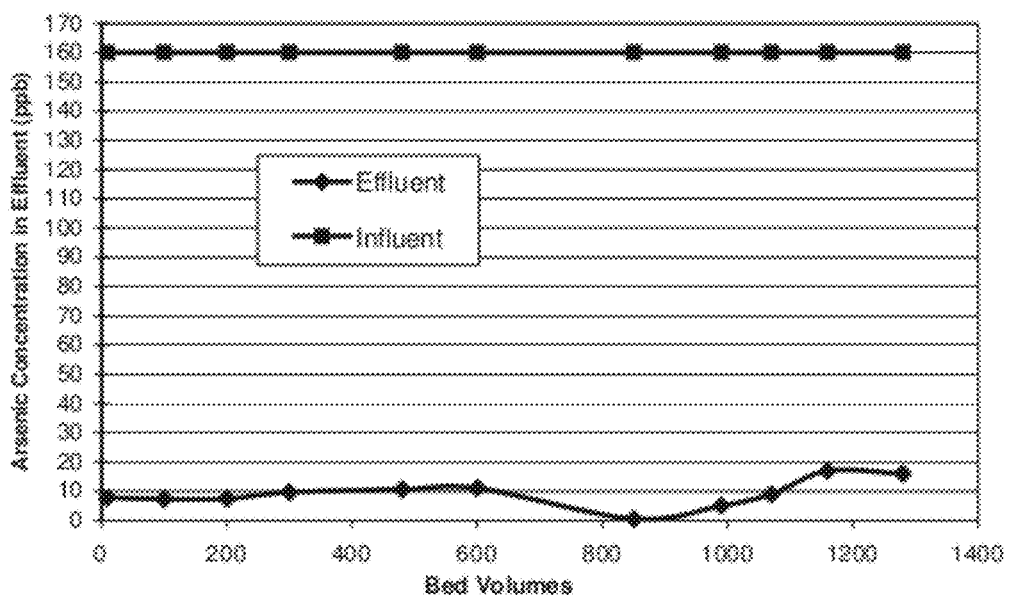
FIG. 4 is a graph of arsenic concentration versus bed volumes of solution for a disclosed lanthanum-iron filtering composition.

RSSCT With DE-LF 32-100 mesh DE-LF material dried at room temperature was studied running a column in a down-flow mode. Samples of the treated water were taken regularly for arsenic analysis. The pH, Eh and the flowrate of the sample were recorded. The samples were acidified in 10% nitric acid. As shown in FIG. 4, breakthrough at 10 ppb was reached at about 1100 bed volumes.

TABLE 4

Test conditions of column:

| | |
|---|---|
| Media was loaded dry | Flowrate: 28-35 cc/min. |
| System Pressure: Constant less than 5 psi | Average Contact Time: 6 min. |
| Bed dimension: 1.5" diameter by 10" long | Influent pH: 7.5 |
| Bed Volume: 100 cc | Effluent pH: 7.6 |
| Mesh Size of Media: 32-100 | No pH adjustment |
| | No backwash for adsorptive media |

RSSCT With LFM and LaH

Testing with 32-100 mesh LFM and LaH Materials dried at 200° C.

The columns were run in an up-flow mode. The media were backwashed once. Samples of the treated water were taken regularly for arsenic and lanthanum analysis. The pH, Eh and the flowrate of the sample were recorded. The samples were acidified in 10% nitric acid.

TABLE 5

Test conditions of column:

| | |
|---|---|
| 32-100 mesh Media were loaded dry | Flowrate: 20-40 cc/min. |
| System Pressure: Constant less than 5 psi | Contact Time: 1-2 min. |
| Bed dimension: 0.9" diameter by 4" long | Influent pH: 8.0 |
| Bed Volume: 40 cc | Effluent pH: 8.3 |
| | No pH adjustment |
| | Adsorptive media were backwashed |

Figure 5:
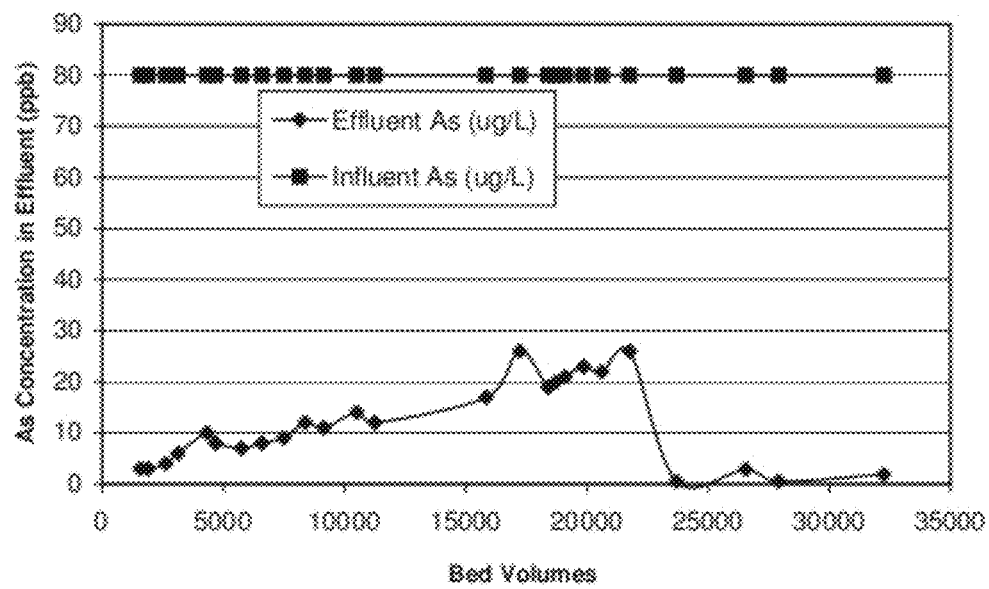
FIG. 5 is a graph of arsenic concentration versus bed volumes of solution for a disclosed lanthanum-iron-magnesium (32-100 mesh) filtering composition.
Figure 6:
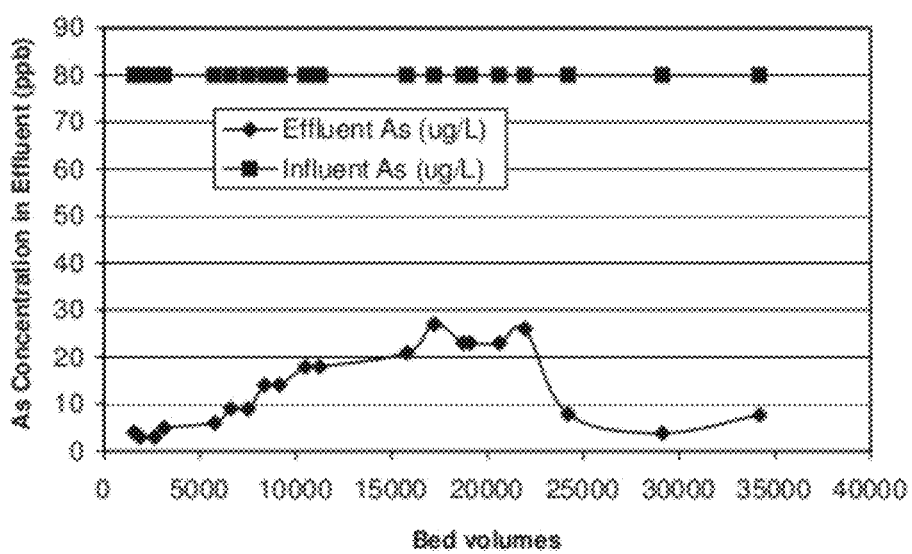
FIG. 6 is a graph of arsenic concentration versus bed volumes of solution for a disclosed LaH (32-100 mesh) filtering composition.

Results of the RSSCTs are illustrated in FIGS. 5 and 6, which indicate that both adsorbent materials can remove and reduce arsenic concentration to below 10 ppb in drinking water. LFM media passed over 10,000, and LaH media about 9,000, bed volumes before breakthrough at 10 ppb. The average contact time for both columns was 1 minute, 15 seconds. Both media continued to remove arsenic at 21,000 bed volumes, indicating their potential capacities.

After 21,000 bed volumes both media were backwashed. The results of the second run show a drop in arsenic concentration in the effluent water for both media. The volume of water treated was over 10,000 and 12,000 bed volumes for LFM and LaH compositions, respectively. The average contact time for both media was 2.0 minutes.

RSSCT With LFM and LaH Materials Dried at 200° C.

100-270 mesh LFM and LaH Materials dried at 200° C. were studied for their arsenic removal characteristics. The column was run in an up-flow mode. Samples of the treated water were taken regularly for arsenic and lanthanum analysis. The pH, Eh and the flowrates of the samples were recorded. The samples were acidified in 10% nitric acid.

TABLE 6

Test conditions of columns:

| | |
|---|---|
| Media were loaded dry | Flowrate: 20-10 cc/min. |
| System Pressure: Constant less than 5 psi | Average Contact Time: 1.6 min. |
| Bed dimension: 0.9" diameter by 2" long | Influent pH: 8.2 |
| Bed Volume: 20 cc | Effluent pH: 8.5 |
| | No pH adjustment |
| | No backwash of Adsorptive Media |

Figure 7:
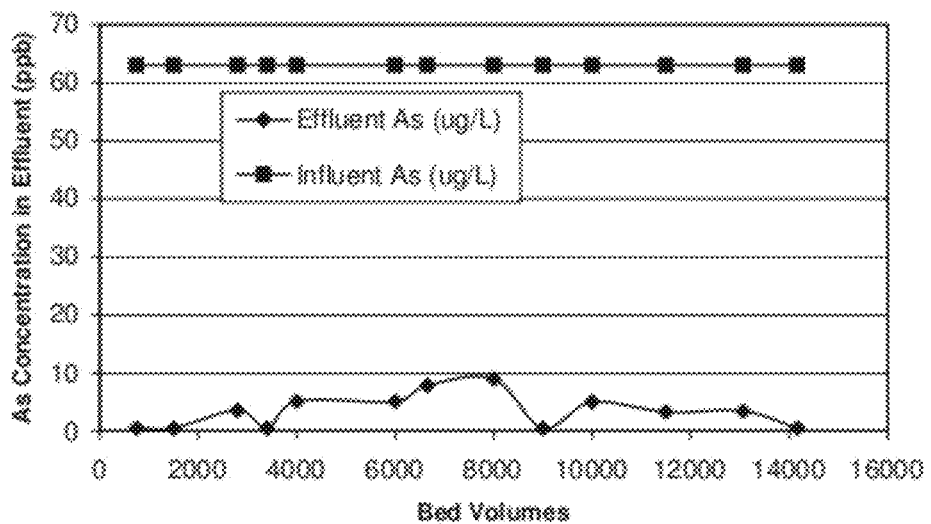
FIG. 7 is a graph of arsenic concentration versus bed volumes of solution for a disclosed LaH (100-270 mesh) filtering composition.
Figure 8:
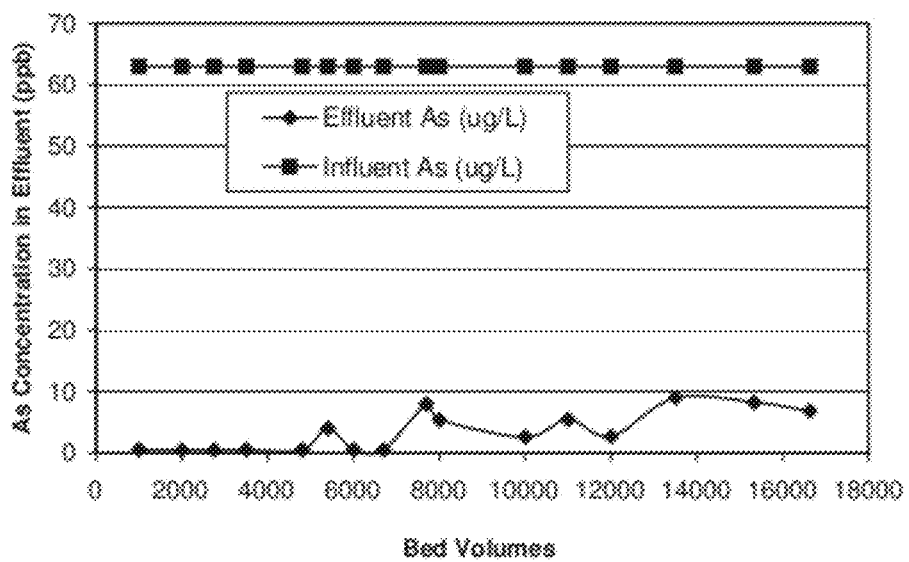
FIG. 8 is a graph of arsenic concentration versus bed volumes of solution for a disclosed lanthanum-iron-magnesium filtering (100-270 mesh) composition.
Figure 9:
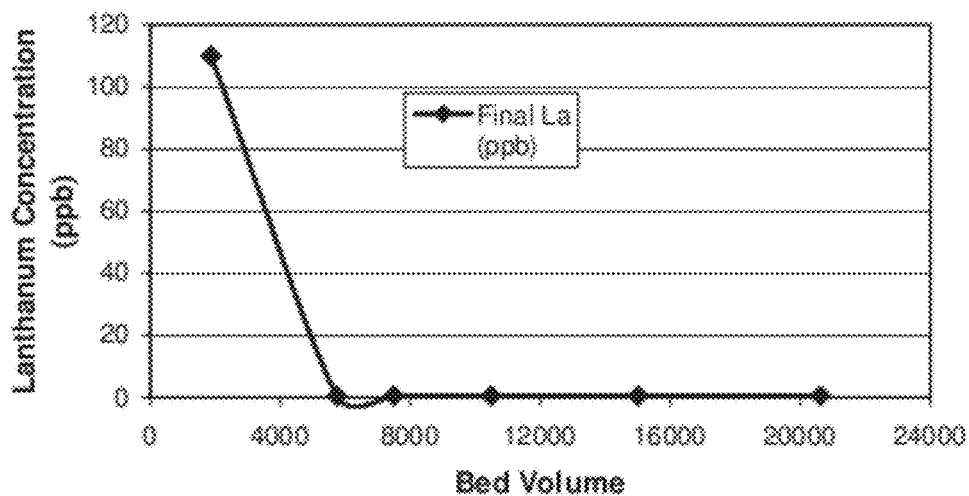
FIG. 9 is a graph of lanthanum concentration versus bed volumes of solution of a disclosed LaH (32-100 mesh) filtering composition.
Figure 10:
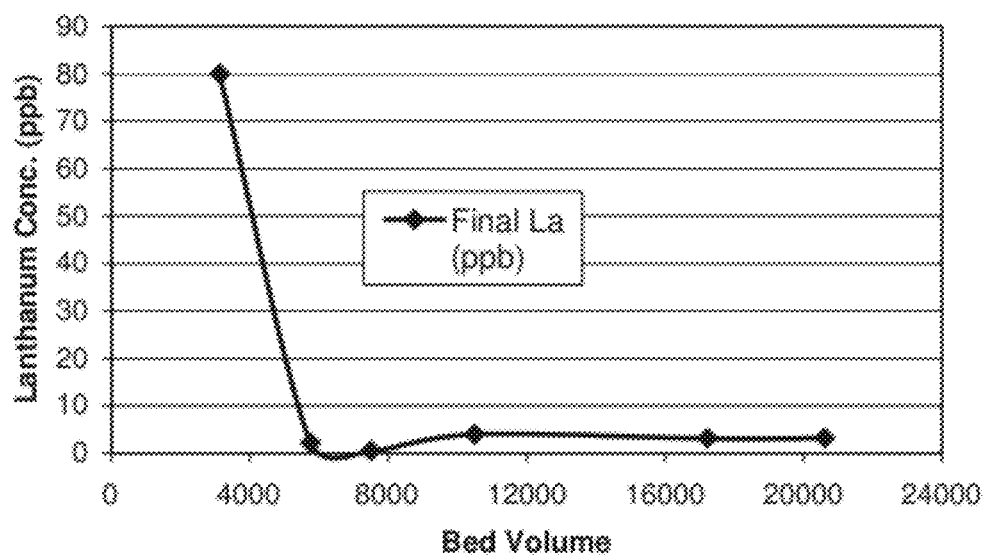
FIG. 10 is a graph of lanthanum concentration versus bed volumes of solution of a disclosed lanthanum-iron-magnesium (32-100 mesh) filtering composition.
Figure 11:
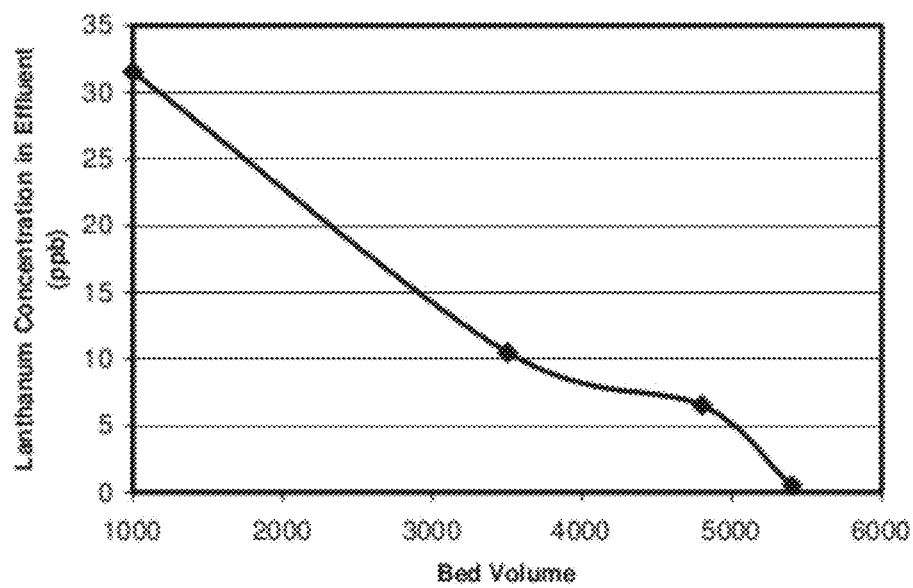
FIG. 11 is a graph of lanthanum concentration versus bed volumes of solution of a disclosed lanthanum-iron-magnesium (100-270 mesh) filtering composition.
Figure 12:
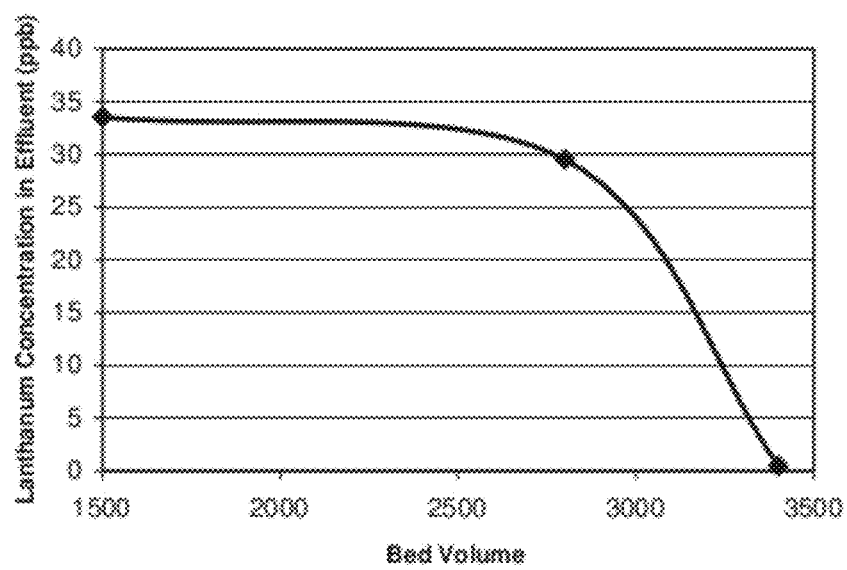
FIG. 12 is a graph of lanthanum concentration versus bed volumes of solution of a disclosed LaH (100-270 mesh) filtering composition.

Results of the RSSCTs are illustrated in FIGS. 7 and 8. Both media passed over 14,000 bed volumes without reaching 10 ppb. The RSSCT results demonstrate that DE-LFM, LFM and La materials can effectively remove arsenic from drinking water to below 10 ppb. The pH and Eh of the treated tap water ranged from 6.8 to 8.8 and 173.0 to 182.0 mV, respectively.

Leaching of Lanthanum Results

Test results of lanthanum concentration in the column effluent are depicted in FIGS. 9-12. The results indicate lanthanum appears in water at initial stages of treatment of the water regardless of the particle size of the adsorbing composition. This could be attributed to very fine residual lanthanum hydroxide particles that passed through the filters. The concentration of lanthanum reduces to less than 1.0 to about 1.5 ppb from 3500 to over 20,000 bed volumes of water passed.

EXAMPLE 4

Preparation of Adsorbent Compositions From Nitrate Salts

Figure 13:
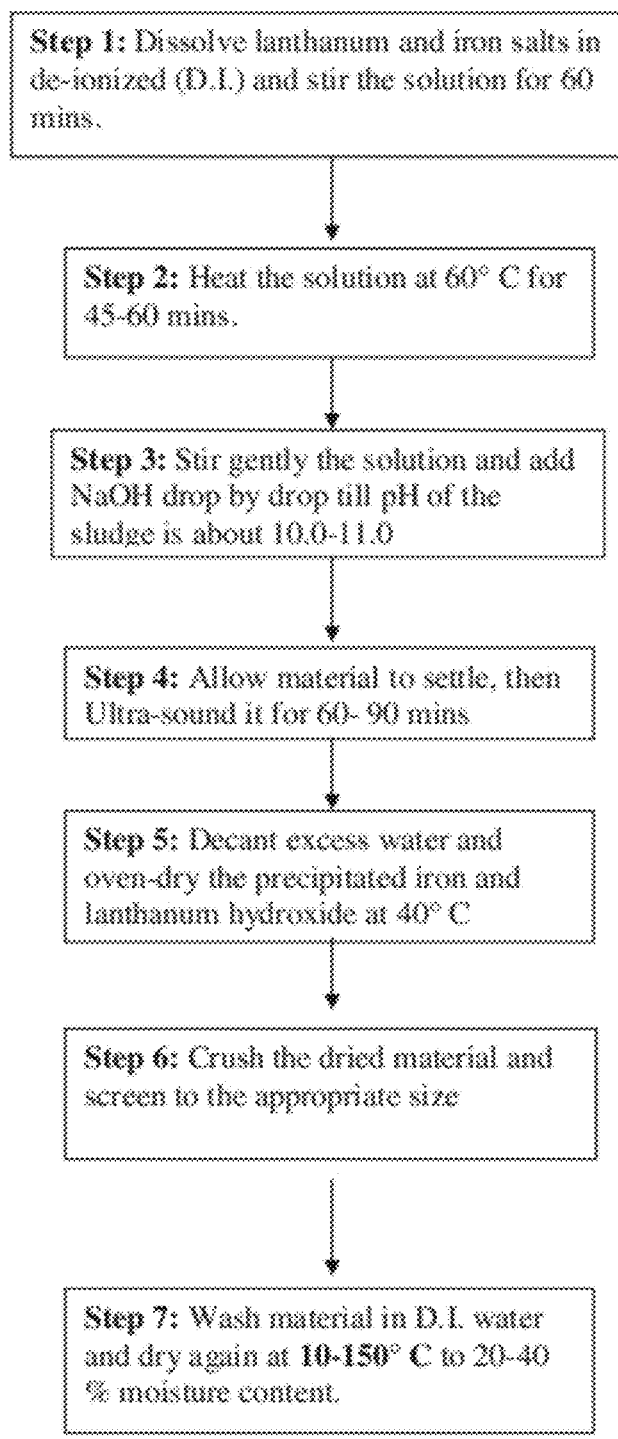
FIG. 13 is a flowchart illustrating a method of making a disclosed lanthanum-iron filtering composition.
Figure 14:
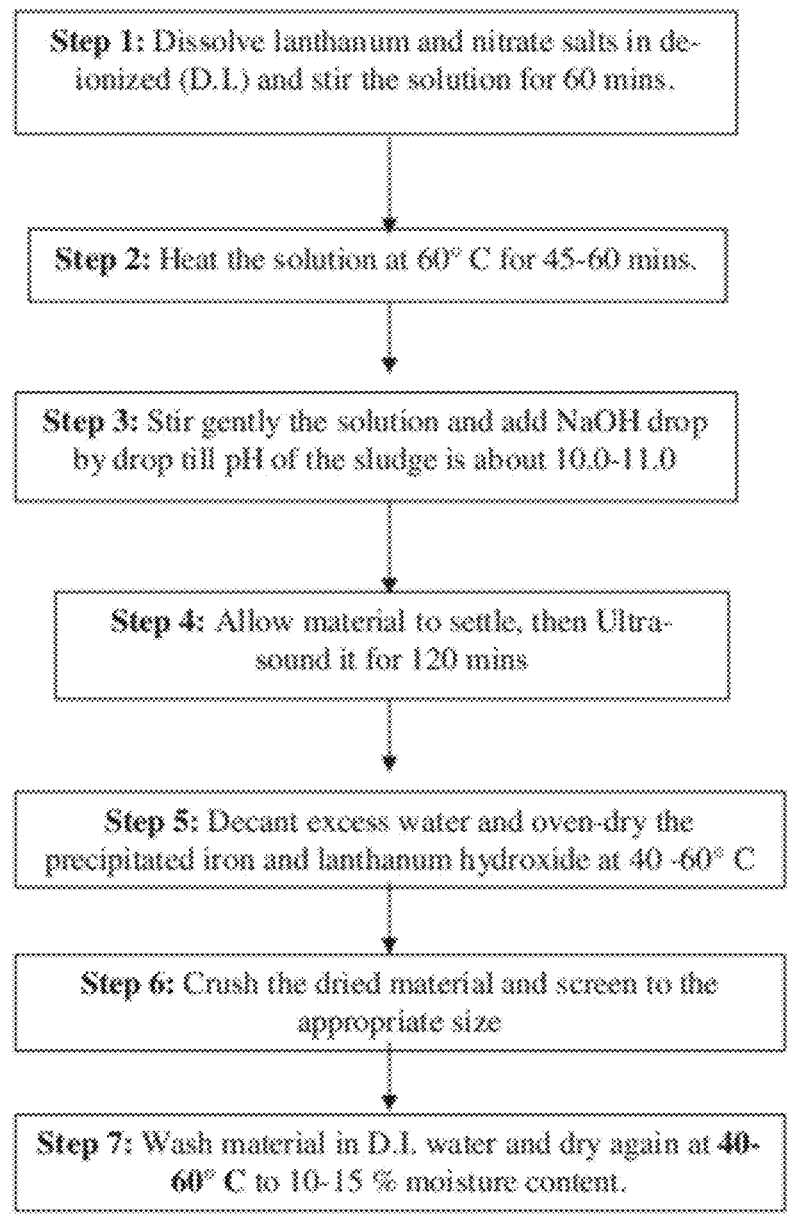
FIG. 14 is a flowchart illustrating a method of making a disclosed lanthanum-iron filtering composition.

A variety of lanthanum-iron compositions were prepared from nitrate salts by various routes and subjected to various combinations of work up conditions. Lanthanum/iron filter composition A was prepared as described in FIG. 13. Composition B was prepared similarly, except that the drying temperature was 100° C. and the moisture content of the composition was about 5-10%. A further composition C was prepared as depicted in FIG. 14. Composition D was prepared in an analogous manner, except step 4 was omitted. Material E was prepared according to FIG. 14, except that step 7 was omitted. Instead, the washed material was kept moist (no drying), with moisture content of about 20-40%.

Figure 15:
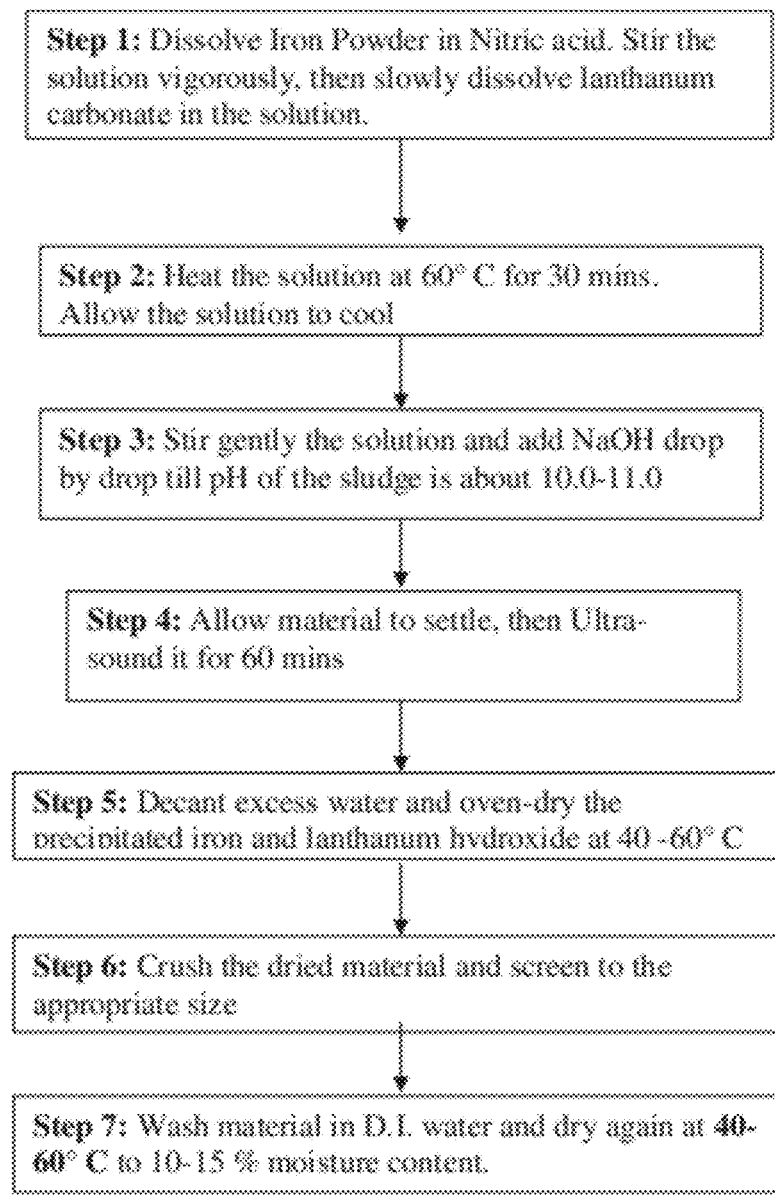
FIG. 15 is a flowchart illustrating a method of making a disclosed lanthanum-iron filtering composition.
Figure 16:
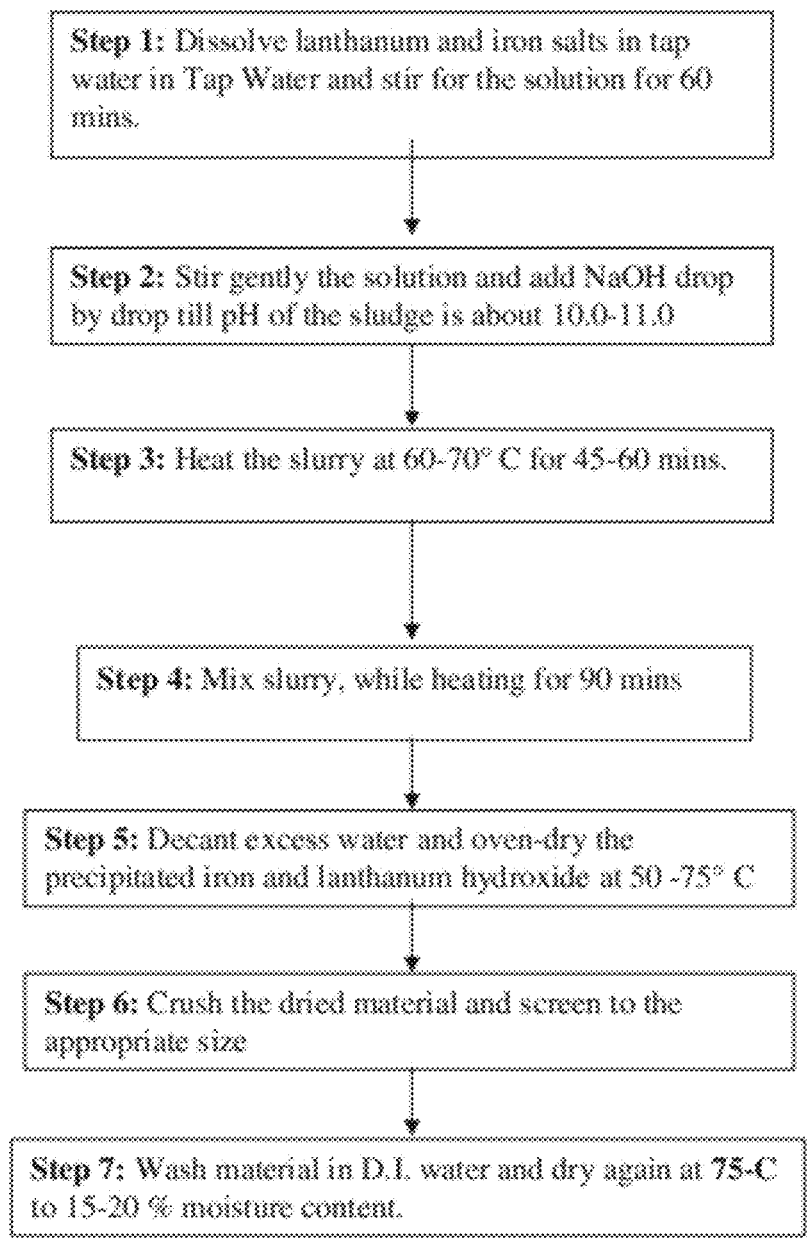
FIG. 16 is a flowchart illustrating a method of making a disclosed lanthanum-iron filtering composition.
Figure 17:
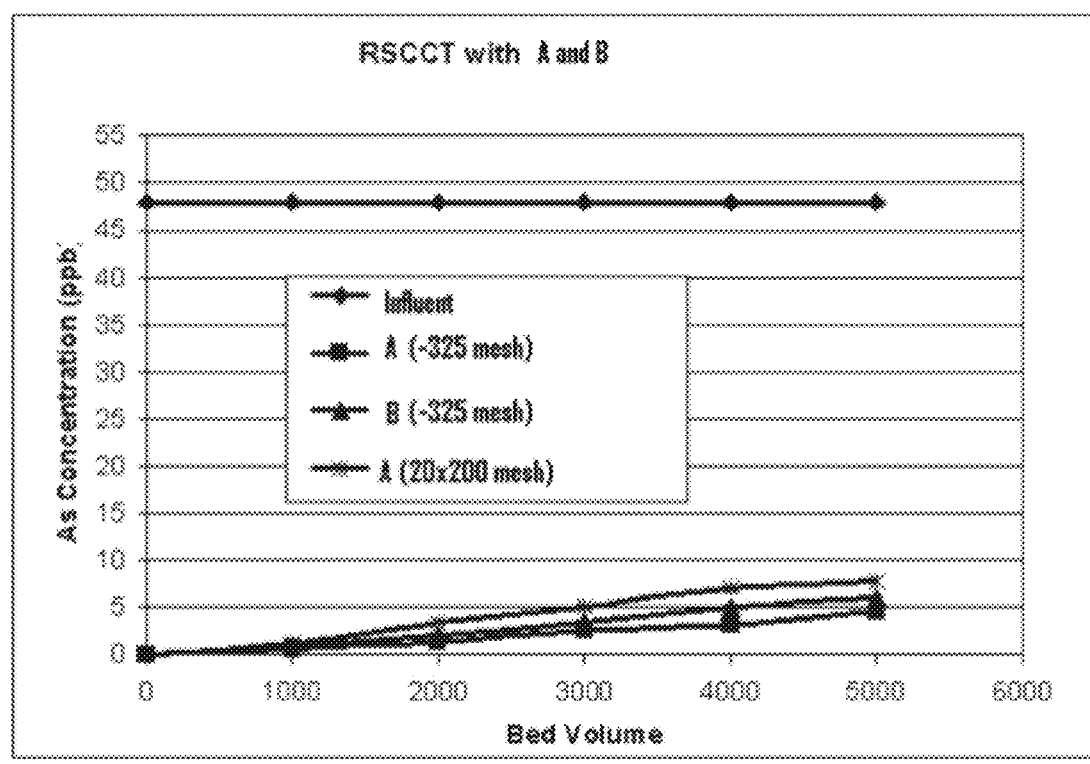
FIG. 17 is a graph of arsenic concentration versus bed volumes of solution for disclosed lanthanum-iron filtering compositions A and B.
Figure 18:
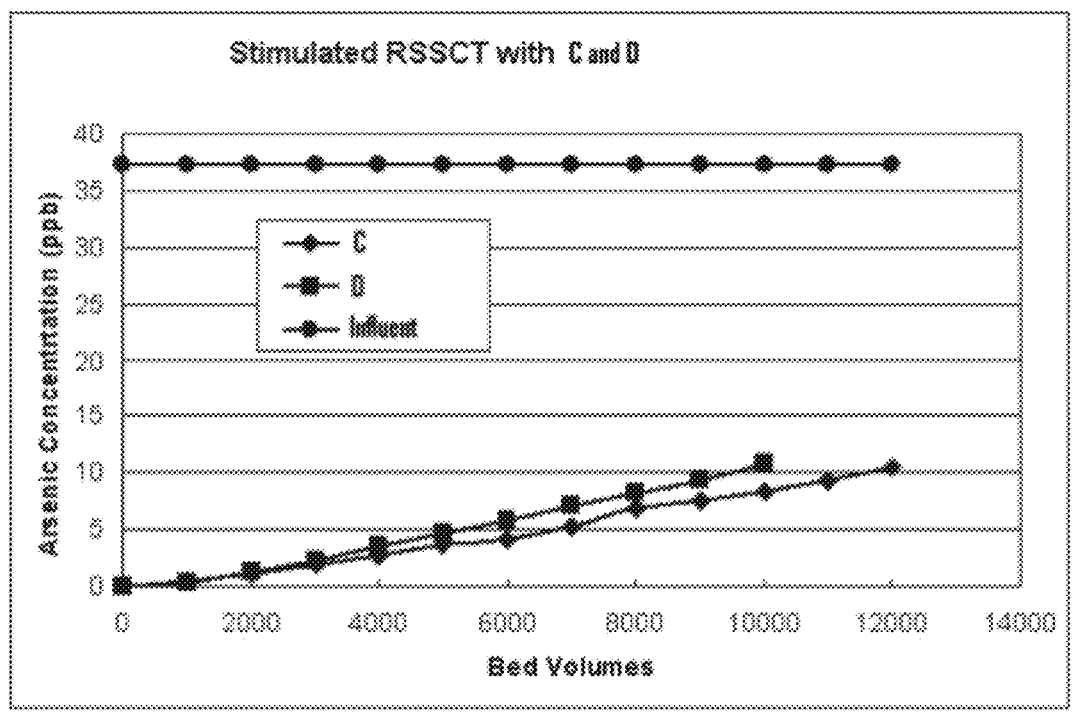
FIG. 18 is a graph of arsenic concentration versus bed volumes of solution for a disclosed lanthanum-iron filtering compositions C and D.
Figure 19:
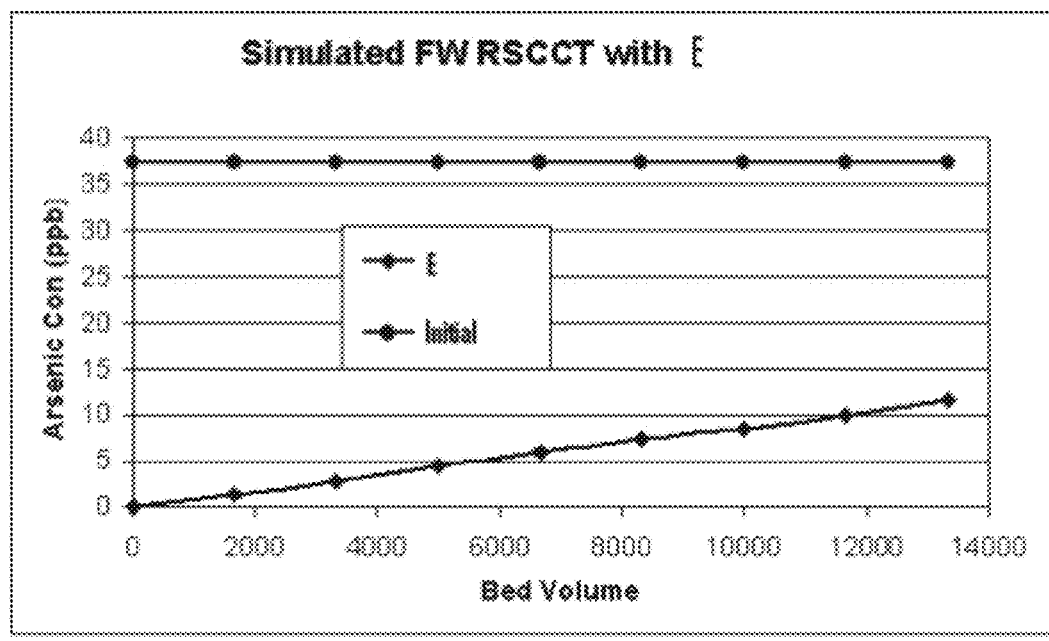
FIG. 19 is a graph of arsenic concentration versus bed volumes of solution for a disclosed lanthanum-iron filtering composition E.
Figure 20:
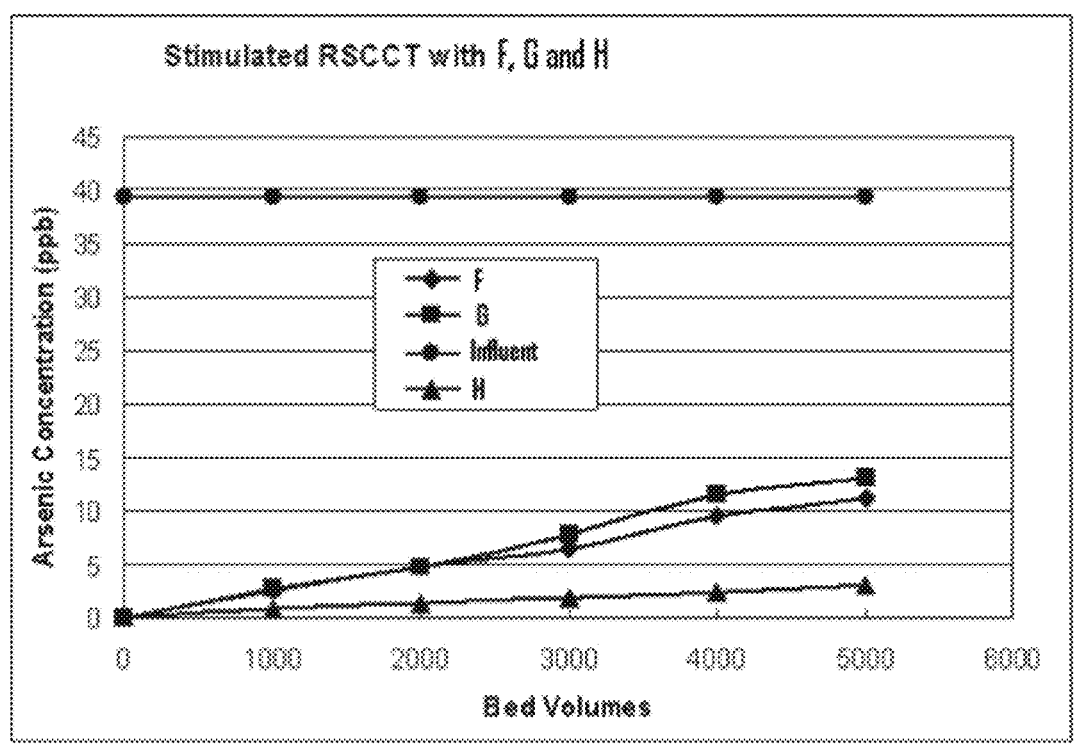
FIG. 20 is a graph of arsenic concentration versus bed volumes of solution for disclosed lanthanum-iron filtering compositions F, G, and H.

Material F was prepared as shown in FIG. 15. Material G was prepared analogously, with the exception that step 4 was omitted. Material H was prepared as illustrated in FIG. 16. The properties of the various compositions are summarized in Table 7.

TABLE 7

Composition Characteristics

| Media | Color | Bulk Density (g/cc) | Particle Size (mesh) | Surface Area (m²/g) | Structure |
|---|---|---|---|---|---|
| A | Brown | 1.0 | −325 | 198.5 | Crystalline |
| | | | 20 × 200 | 236.7 | Crystalline |
| B | Reddish Brown | 1.0 | −325 | 171.6 | Crystalline |
| C | Reddish Brown | 0.7 | −325 | 197.8 | Crystalline |
| D | Reddish Brown | 0.6 | −325 | 218.5 | Crystalline |
| E | Reddish Brown | 0.7 | −325 | 197.8 | Crystalline |
| F | Reddish Brown | 0.7 | 100 × 325 | 187.1 | Crystalline |
| G | Reddish Brown | 0.8 | 100 × 325 | 188 | Crystalline |
| H | | 1.0 | −325 | 253 | Crystalline |

EXAMPLE 5

Simulated Rapid Small Scale Column Test (RSSCT) for Arsenic Removal Using La—Fe Nitrate Compositions The arsenic removing capabilities of the media described in Example 4 were tested using groundwater obtained from Fernley, Nev., using the RSSCT procedure of Example 3. The empty bed contact time was three seconds. The results of these tests are depicted in FIGS. 17 to 20. As shown in the Figures, compositions A-H were effective in removing arsenic from the test solution.

EXAMPLE 6

Arsenic Stability

Characterization of Spent Media

Spent I, a lanthanum-iron-magnesium active agent on a diatomaceous support, was characterized for total arsenic and other contaminants adsorbed, residual adsorptive capacity (RAC) for arsenic, surface area, TCLP and composition (XRD & SEM).

RAC Testing for Arsenic

"Spent" I, a lanthanum-iron active agent on a diatomaceous earth substrate prepared according to the methods of the present disclosure, was studied to determine if it had any further capacity to adsorb arsenic. Fresh I was used as a control.

Material tested included I from a top portion of a column (TC), unwashed I, I washed with de-ionized water at pH 4.2, and unused I (control). Water used for testing was de-ionized water from Clark Station Lab. Arsenite in the form of sodium arsenite was used as the arsenic source. The pH of the water was adjusted to 6.6 using HCl and NaOH. Bleach was used for arsenite oxidation.

RAC testing proceeded as follows. Four liters of 1000 ppm arsenite solution was prepared using de-ionized water. Four drops of bleach (commercial grade) were added to the solution. The pH of the resulting solution was adjusted to 6.5. For each leaching bottle, 10.0 g of each media was added to 500 ml of the arsenic solution. Each bottle was agitated for 12 hours in a shaker. The media was then allowed to settle and was filtered. The acidified filtrates were analyzed for arsenic. The media were dried to remove excess moisture content and weighed to check for any loss of material.

Test & Analytic Results

Results of the RAC, surface area, and carbon content analysis are presented in Table 8. The spent media was sent to an independent lab for analysis, the results of which are presented in Table 9. The composition also removed significant amounts of Ba, Cr, V, Pb, and Zn.

TABLE 8

Removal of Arsenic with I. Initial arsenic con. = 1005 ppm

| Media | Final As Con. (ppm) | RAC for Arsenic (ppm) | Surface Area (m²/g) | % Carbon Content |
|---|---|---|---|---|
| I (TC) | 17.8 | 50K | 131.7 | 2.51 |
| I (CUW) | 23.3 | 49.8k | NA | 2.95 |
| I (CW) | 23.4 | 49.8k | NA | NA |
| I (control) | 0.016 | Over 50K | 203.8 | 0.95 |

TABLE 9

Composition of I with Contaminants

| Substance | Concentration (mg/Kg) | Source |
|---|---|---|
| Arsenic | 1400 | From Fernley Water (FW) |
| Barium | 210 | |
| Calcium | 6600 | From FW |
| Chromium | 100 | Possibly from Media and FW |
| Copper | 1300 | From FW |
| Iron | 280K | From Media |
| Lead | 410 | From FW |
| Manganese | 740 | Possibly from Media and FW |
| Vanadium | 520 | From FW |
| Zinc | 380 | From FW |
| Lanthanum | 280K | From Media |

Arsenic Stability

The spent media were subjected to TCLP and arsenic leaching in alkaline medium. Desorption was carried out as follows. Two de-ionized waters were prepared, one at pH 3.1 and one at pH 10.1. In leaching bottles, 1.0 g of media was added to 500 ml of pH adjusted de-ionized water. The bottles were agitated, with samples being removed after 15, 45, 60, and 1320 minutes. The samples were filtered, acidified, and analyzed for arsenic.

After 22 hours some of the spent media broke down to very fine particles. The filtrate from the pH 3.1 solution was clearer than the filtrate from the pH 10.1 solution. The pH of leach solutions was measured; the 3.1 solution increased to 6.3 after leaching and the pH of the pH 10.1 solution decreased to 9.3.

Figure 21:
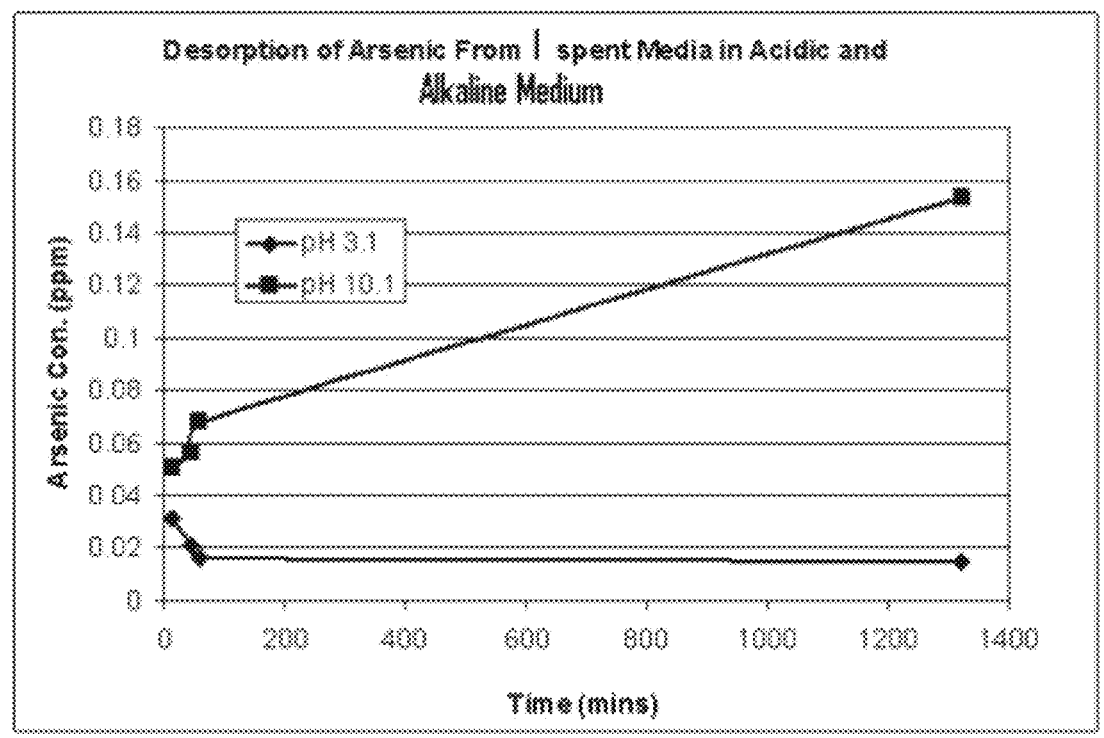
FIG. 21 is a graph of arsenic concentration versus bed volumes of solution for a spent lanthanum-iron filtering composition I.

As shown in FIG. 21, there was a gradual release of arsenic at pH 10.1 during 22 hours of agitation and very minimal release of arsenic at pH 3.1. The adsorbed arsenic in I appears to be quite stable in acidic as compared with alkaline medium. The breakdown of the media in the alkaline solution after 22 hours may have contributed to the release of arsenic.

Figure 22:
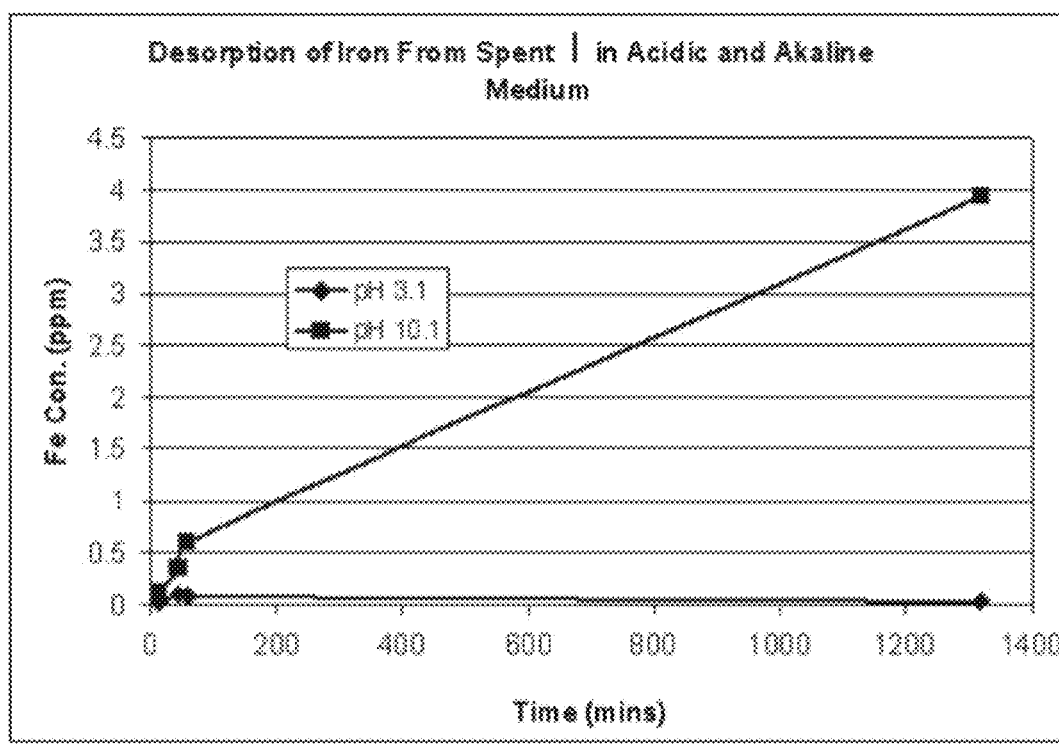
FIG. 22 is a graph of iron concentration versus bed volumes of solution for a spent lanthanum-iron filtering composition I using alkaline and acidic media.

The results shown in FIG. 22 indicate that significant amount of iron leached out in alkaline medium. The observed high concentration of iron after 22 hours in pH 10.1 solution could also be due to the breakdown of the media. In acidic medium iron is very stable.

Figure 23:
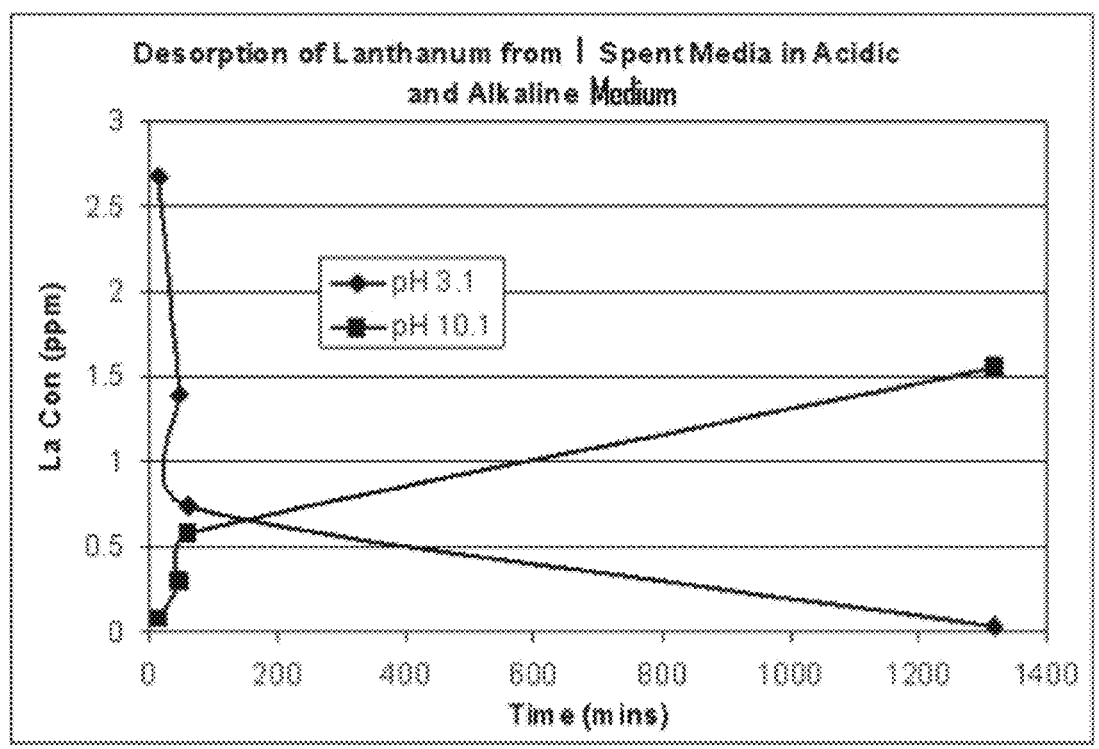
FIG. 23 is a graph of lanthanum concentration versus bed volumes of solution for a spent lanthanum-iron filtering composition I in alkaline and acidic media.

The high and sharp decline of lanthanum at pH 3.1, depicted in FIG. 23, suggests possible dissolution or washing of residual lanthanum from the composition. The gradual increase in lanthanum concentration at pH 10.1 could be attributed to breakdown of the media due to prolonged agitation.

To verify the increase in concentrations of arsenic, iron and lanthanum observed at pH 10.1 due to attrition, the compositions were dried after 22 hours and weighed. In pH 3.1 solution, there was a loss of 0.07 g, about 7% of the original weight. In pH 10.1 solution there was a loss of about 0.13 g, about 13% of the original weight.

Characterization of spent I media suggests that composition I still had significant arsenic absorbing capacity even after removing about 50,000 ppm arsenic. The gradual release of arsenic from the media in alkaline solution (pH 9.3-10.1) could be primarily due to desorption of iron. Lanthanum release in acidic solution could be due to dissolution of residual fine lanthanum particles and in alkaline solutions attributed to possible breakdown of media.

EXAMPLE 7

Arsenic Stability and Characterization Spent Medias

This example illustrates the stability of I and a competing E33 media (an iron oxide/hydroxide material available from Bayer MaterialScience of Pittsburgh, Pa.) loaded with arsenic as a function of pH and time. Testing was done in two phases which included adsorption and desorption of arsenic from the media.

The water used for testing was de-ionized water from Clark Station Lab. Arsenate in the form of sodium arsenate was used. HCl and NaOH were used for pH adjustments. The selected pHs of water were 6.6 for adsorption, 4.0 and 9.0 for desorption. The procedure for the adsorption step was as follows.

A 1000 ppm arsenate solution was prepared in de-ionized water. The pH of the arsenate solution was adjusted to 6.6. 5.0 g of each composition was added to 500 ml of the arsenate solution in a leaching bottle. The bottle was agitated for 16 hours in a shaker. The media was allowed to settle and then was filtered. The filtrate was acidified for arsenic analysis. The media was dried to remove excess moisture content and then weighed to check for any losses.

Desorption studies were carried out by preparing two D.I waters at pHs 4.0 and 9.0. 1.0 g of was added to 500 ml of de-ionized (pH adjusted) in leaching bottles. The bottles were agitated. Samples were obtained of the leached solution at 15, 30, 60, 240, 480 and 1500 minutes. The samples were filtered and acidified for arsenic analysis.

Figure 24:
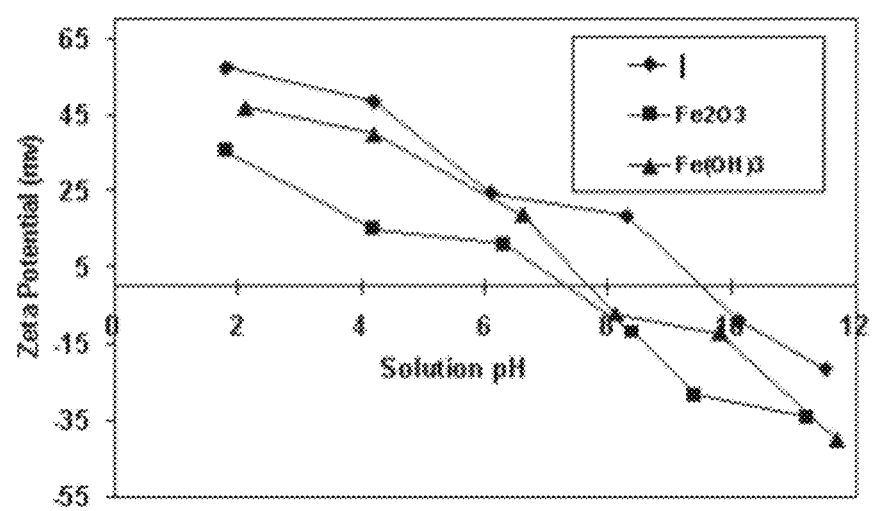
FIG. 24 is a graph of zeta potential versus pH for a filtering composition I, $Fe_2O_3$, and $Fe(OH)_3$

The zeta potential of I, $Fe(OH)_3$, and $Fe_2O_3$ was studied by measuring the zeta potential over a range of pHs from about pH 2 to about pH 12. The zeta point of each composition was measured. The results of these studies are shown in FIG. 24.

Results

TABLE 10

Adsorption of Arsenic from de-ionized water at pH 6.6., initial As concentration was 1100 ppm

| Media | Final Weight (g) | Final As Conc. (ppm) | As removed (ppm) | As adsorbed (ppm) |
|---|---|---|---|---|
| I | 4.2 | 564 | 536 | 50.4K |
| E33 | 2.4 | 880 | 220 | 22K |

The results of the adsorption testing indicate that I has about twice the adsorptive capacity of E33 for arsenic removal in D.I water. I also appears to be stronger than E33 when subjected to abrasion. About 50% of E33 broke down compared to 10% of I.

Figure 25:
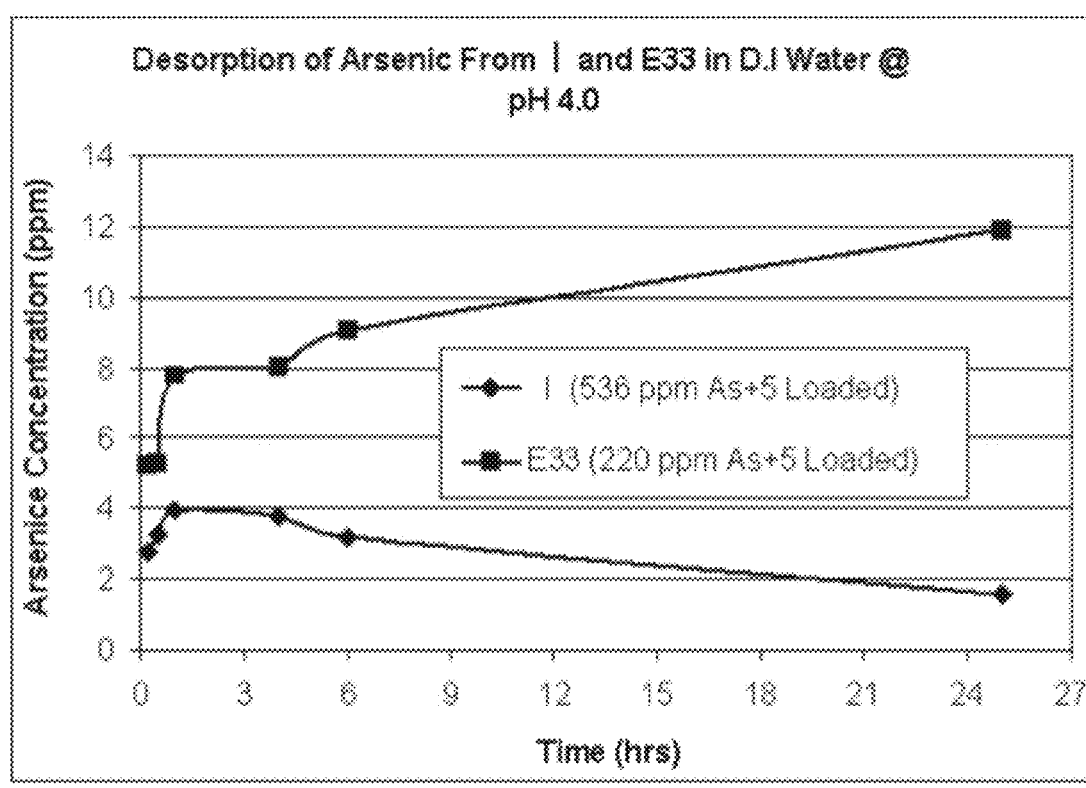
FIG. 25 is a graph of arsenic concentration versus time for a disclosed filtering composition I and a commercially available iron hydroxide material at pH 4.0.

As shown in FIG. 24, composition I had a higher (more basic) zeta point than the commercially available $FeO_3$ or $Fe(OH)_3$. Correspondingly, from the results presented in FIG. 25, I appears to have better stability in arsenic retention than commercially available E33 in acidic water. I desorbed less arsenic over time than E33 despite its higher loading of arsenic. The gradual decline of arsenic release after 60 minutes from I could be attributed to re-adsorption of arsenic by iron.

I desorbs less arsenic than E33, despite higher arsenic loading. The results of the stability testing of I indicate the media is better than E33 in removing and retaining arsenic.

Characterization of Spent Media

Spent compositions (I, E33 and GFH (available from Siemens Water Technologies of Warrendale, Pa.) were characterized for total arsenic adsorbed, TCLP and surface area. The results of these characterizations are presented in Tables 11 and 12. I loaded more arsenic than E33 and GFH.

TABLE 11

Arsenic loaded by Medias

| Media | Arsenic Loaded (ppm) | TCLP for Arsenic (ppm) | Surface Area (m2/g) |
|---|---|---|---|
| I | 940 | <0.2 (passed) | 178 |
| E33 | 540 | <0.1 (passed) | TDB |
| GFH | 210 |  | TDB |

TABLE 12

I Digest Results of other contaminants

| Contaminant | Concentration (ppm) |
|---|---|
| Barium | 180 |
| Cadmium | <12 |
| Chromium | 29 |
| Lead | 350 |
| Mercury | 0.084 |
| Selenium | <380 |
| Silver | <12 |

EXAMPLE 8

Removal of Arsenic From Fernley Water

This Example demonstrates removal of arsenic from the city of Fernley Nev. well water (FW), the composition of which is summarized in Table 13, with different compositions and measures the effect of influent water pH on performance. The medias I (described in Example 7), La(OH)$_3$ (prepared by neutralizing LaCl$_3$ with NaOH at pH>10.) and Fe(OH)$_3$ (EC33) were all prepared. The testing protocol used for removing arsenic was SRSCCT (A jar test that simulates rapid small scale column testing). The initial pH of FW was 7.8, which was adjusted with HCl. 0.5 ml of each media in 500 ml water was used to simulate 1,000 bed volumes per run. The contact time was 30 minutes per run, which was about 3.0 seconds empty bed contact time.

TABLE 13

Fernley Well 4 Water Quality

| Substance | Concentration (ppm) | Source |
|---|---|---|
| Total Alkalinity | 160 | CaCO3 |
| Bicarbonate | 160 |  |
| Carbonate | <2 |  |
| Chloride | 33 |  |
| Fluoride | <0.1 |  |
| Sulfate | 110 |  |
| TDS | 620 |  |
| Total Phosphous | 0.02 |  |
| Antimony | <0.0025 |  |
| Arsenic | 0.037 |  |
| Barium | 0.032 |  |

TABLE 13-continued

Fernley Well 4 Water Quality

| Substance | Concentration (ppm) | Source |
|---|---|---|
| Calcium | 48 |  |
| Silica | 52 |  |
| Copper | 0.006 |  |
| Iron | 0.053 |  |
| Magnesium | 14 |  |
| Manganese | <0.002 |  |
| Vanadium | 0.021 |  |
| Potassium | 7.7 |  |
| Hardness | 170 |  |

Media Characterization Results:

TABLE 14

Characteristics of Medias @ particle size −325 mesh:

| Media | SA (m2/g) | Density | Final (dry Wt. g) |
|---|---|---|---|
| I | 188.5 | About 0.7 | 0.42 |
| J | 56.3 | About 1.1 | 0.55 |
| Fe(OH)$_3$ | 114.2 | About 1.2 | 0.6 |

As can be seen from Table 14, composition I had the highest surface area and lowest density compared to the iron hydroxide and composition J (lanthanum hydroxide).

Results

Figure 26:
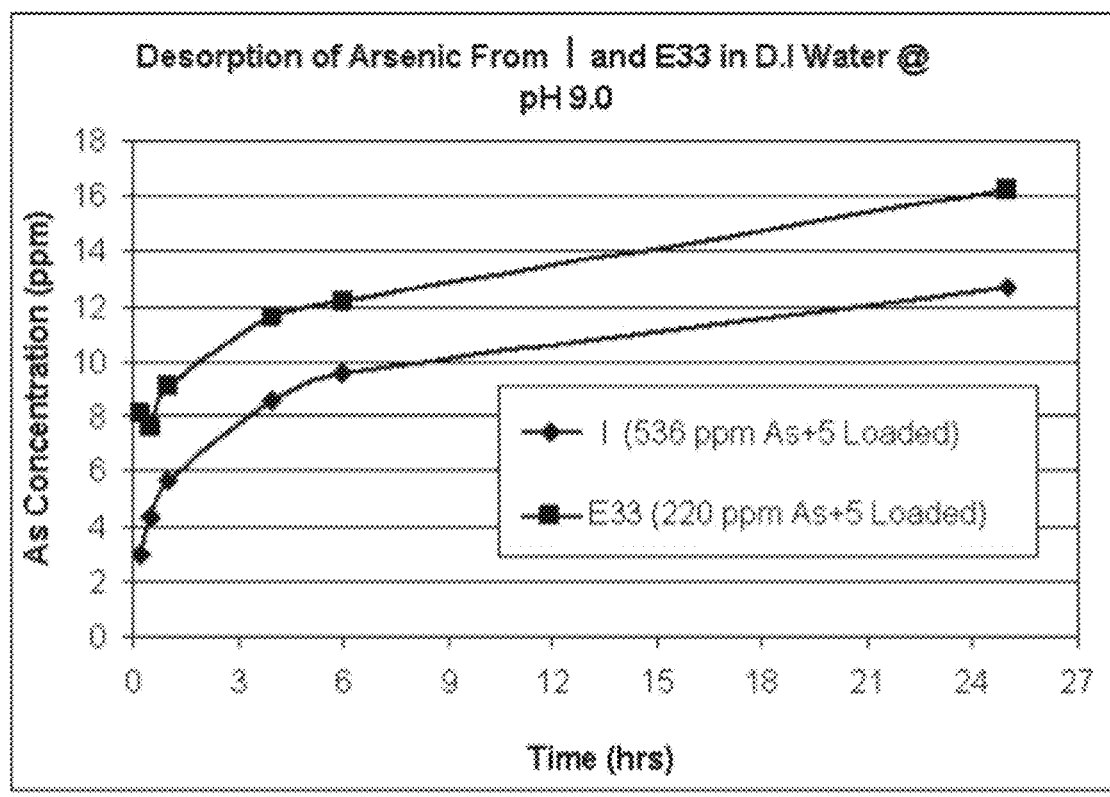
FIG. 26 is a graph of arsenic concentration versus time for a disclosed filtering composition I and a commercially available iron hydroxide material at pH 9.0.
Figure 27:
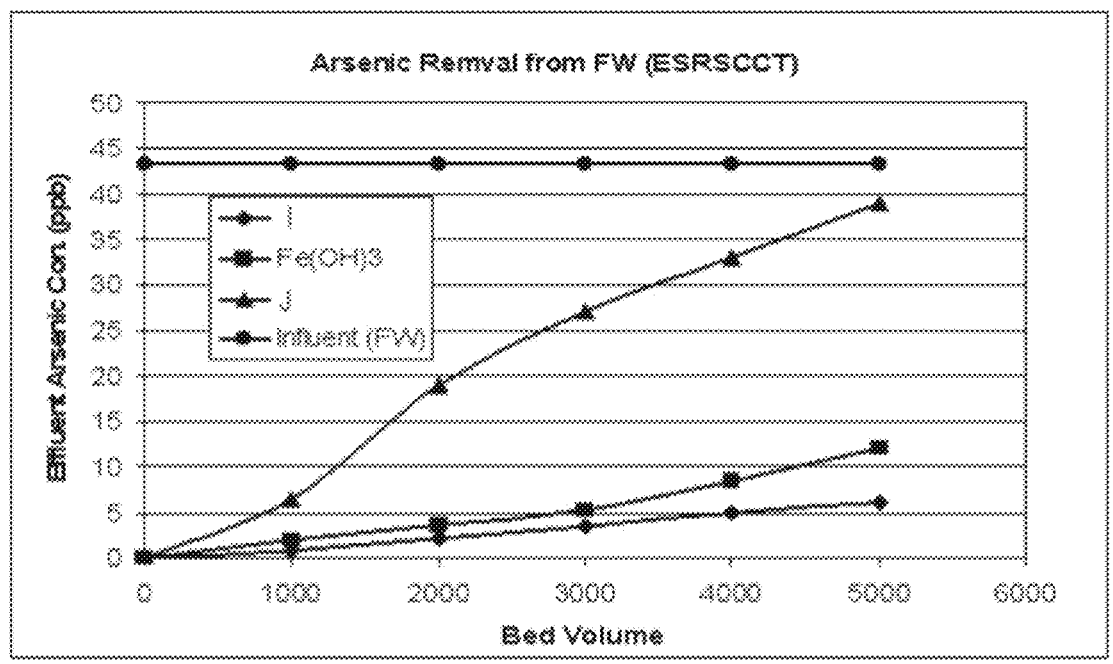
FIG. 27 is a graph of arsenic concentration versus bed volumes of solution for a disclosed lanthanum-iron filtering composition I, a lanthanum hydroxide composition J, and a commercially available iron hydroxide material.
Figure 28:
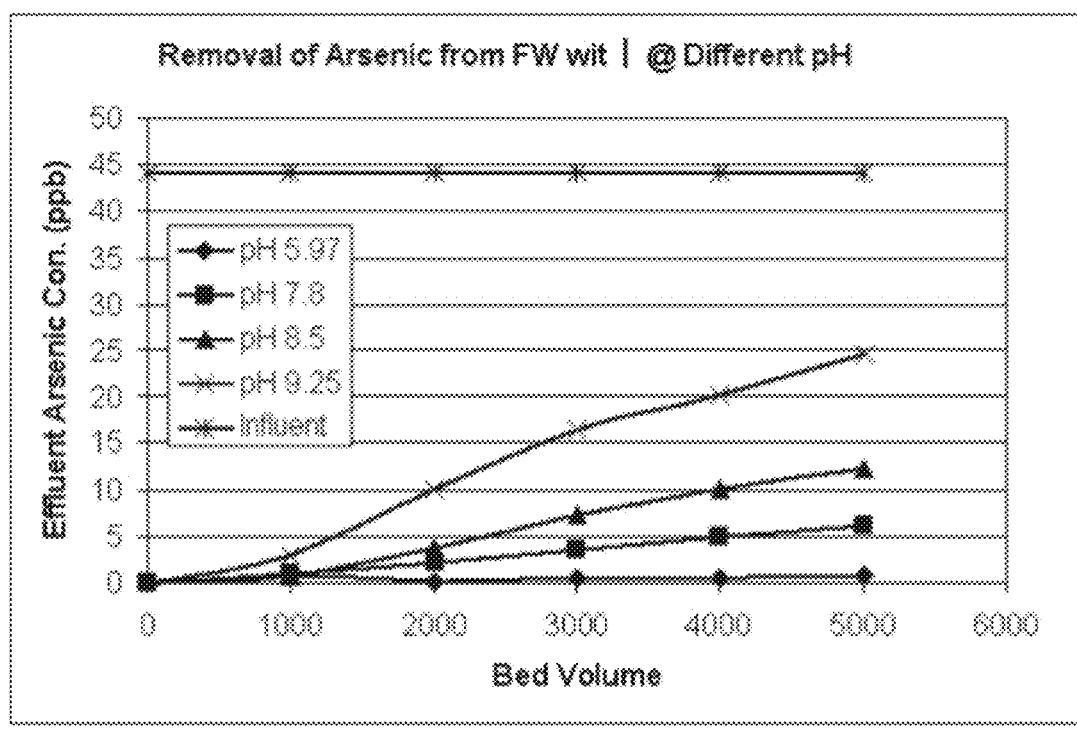
FIG. 28 is graph of arsenic concentration versus bed volumes of solution for a disclosed lanthanum-iron filtering composition I at various pHs.

FIG. 26 summarizes the results of RSCCT with filtering compositions. As shown, I was more effective in arsenic removal than iron hydroxide or lanthanum hydroxide. The influent pH of FW was not adjusted. From the results presented in FIG. 27, the efficiency of I in removing arsenic increases as the pH of the influent water decreases.

The lanthanum based media I has a higher surface area and a lower density than the hydroxides of its constituent elements and is more effective in removing arsenic from well water than La(OH)$_3$ or E33.

EXAMPLE 9

Arsenic Removal From City of Laytonville Calif. Well Water (LW)

This Example describes the removal efficiency of I with and without pH adjustment and compares the performance of composition I and E33 in removing arsenic. This Example also measures the ability of composition I to remove competing anions, such as phosphate, vanadium, and bicarbonate.

The testing protocol used for removing arsenic was SRSCCT (a jar test that simulates rapid small scale column testing). Test conditions involved an initial pH of LW of 7.65. The pH was adjusted to 6.4 by addition of HCl. 0.25 ml of each media in 500 ml water was used to simulate 2,000 bed volumes per run. The contact time was 30 minutes per run, which was about 3.0 seconds empty bed contact time.

TABLE 15

Laytonville Well Water Quality

| Substance | Concentration (ppm) | Source |
|---|---|---|
| Total Alkalinity | 180 | CaCO3 |
| Bicarbonate | 220 |  |
| Carbonate | <1.0 |  |
| Chloride | 6.1 |  |

TABLE 15-continued

Laytonville Well Water Quality

| Substance | Concentration (ppm) | Source |
|---|---|---|
| Fluoride | <0.1 | |
| Sulfate | 43 | |
| TDS | 360 | |
| Total Phosphous | 0.632 | |
| Antimony | <0.0025 | |
| Arsenic | 0.006-0.018 | |
| Boron | 0.22 | |
| Calcium | 46 | |
| Silica | 26 | |
| Copper | N/A | |
| Iron | <0.01 | |
| Magnesium | 26 | |
| Manganese | <0.005 | |
| Vanadium | 0.087 | |
| Potassium | 0.54 | |

Adsorption Results

Figure 29:
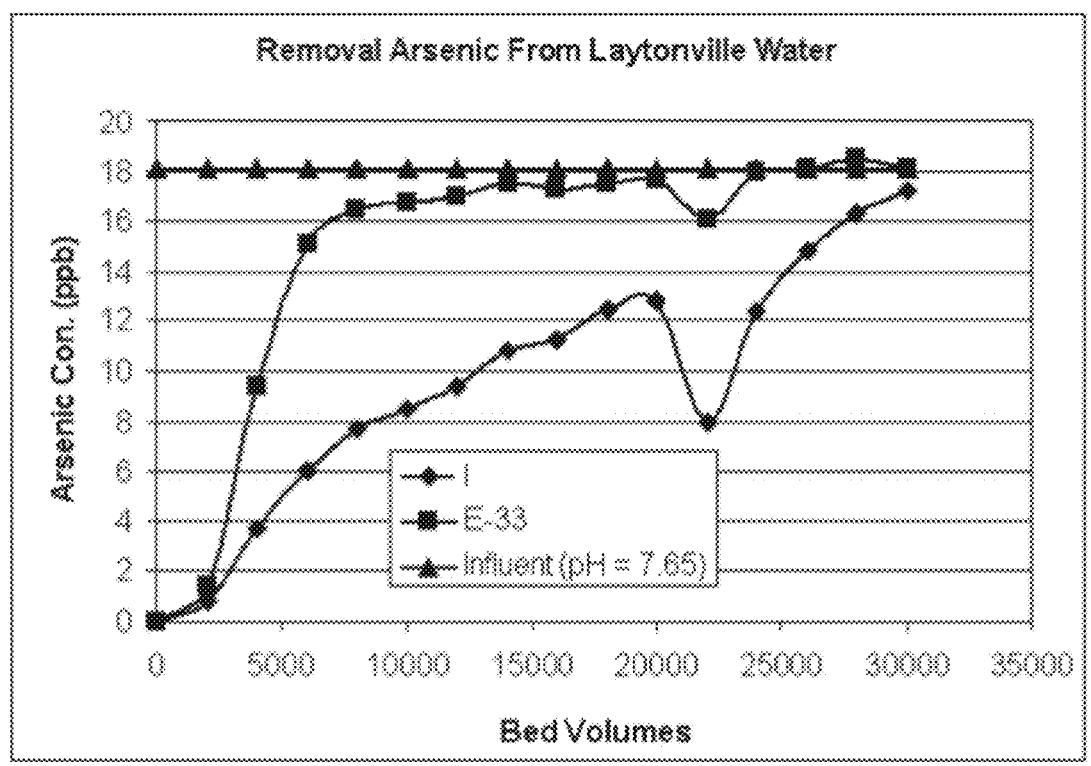
FIG. 29 is graph of arsenic concentration versus bed volumes of solution for a disclosed lanthanum-iron filtering composition I and a commercially available iron hydroxide material.

From the results presented in FIG. 29, the medias 10.0 ppb breakthrough points were about 13,000 bed volumes for I and 4,500 bed volumes for E33. The comparatively low breakthrough point of both medias was attributed to the water pH and the presence of competing phosphate and vanadium anions.

Figure 30:
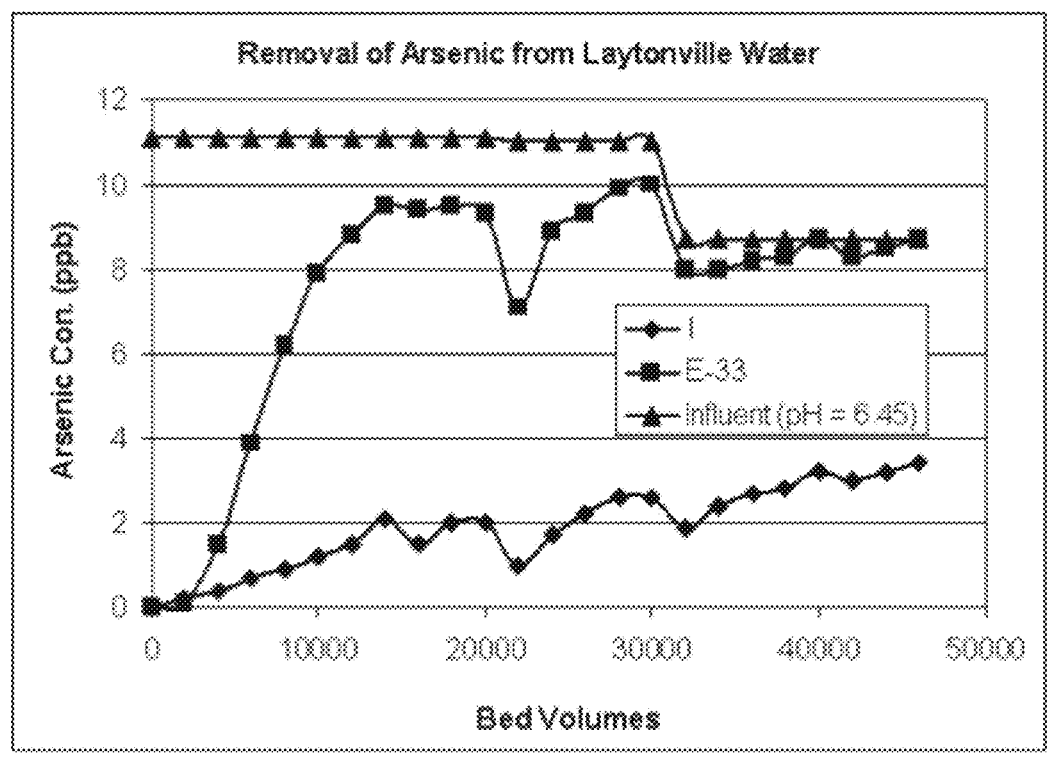
FIG. 30 is a graph of arsenic concentration versus bed volumes of solution for a disclosed lanthanum-iron filtering composition I and a commercially available iron hydroxide material.

In order to improve on the performance of the medias the pH of LW was adjusted to 6.45 before treatment. The results of this testing is presented in FIG. 30 and illustrate E33 breaking through at 46,000 bed volumes, while I still had capacity to remove more arsenic. The observed drops in effluent arsenic concentration are due to rest periods from both compositions. The final pH of effluent water after 46,000 bed volumes was about 6.8 for both compositions.

Figure 31:
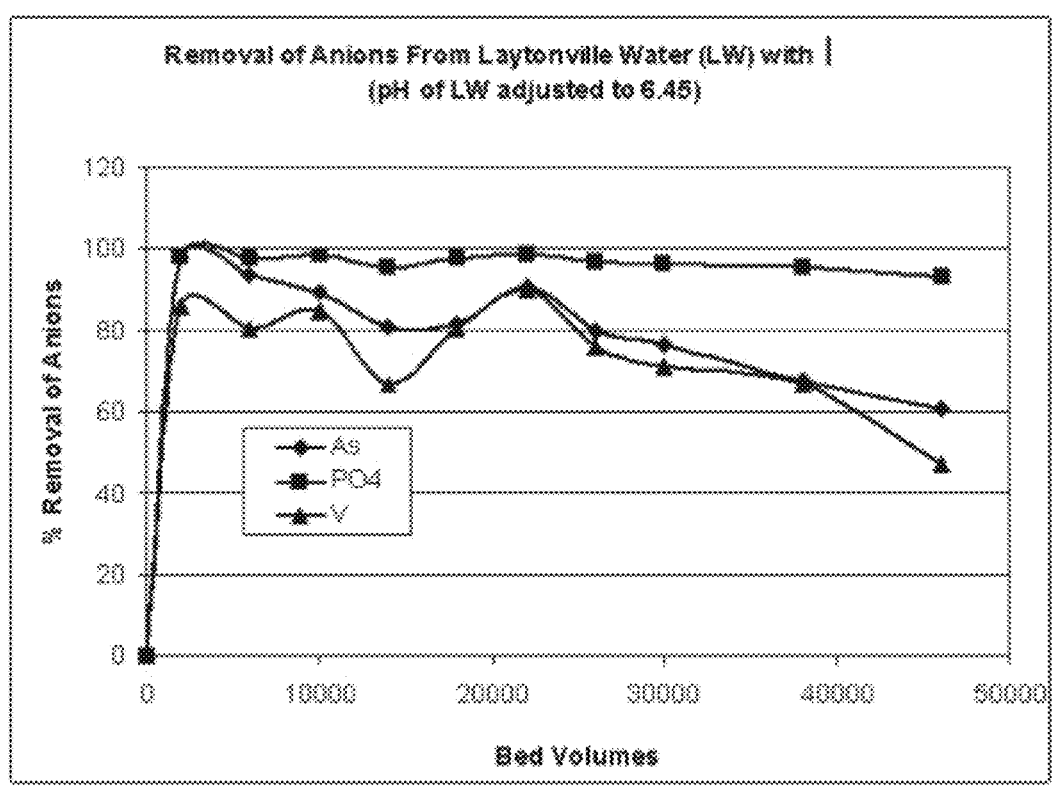
FIG. 31 is a graph of percent anion removal versus bed volumes of solution for a disclosed lanthanum-iron filtering composition I.

The removal of other contaminants, were also investigated and the results are presented in FIG. 31 and Table 16. As illustrated in FIG. 31, composition I has a very high affinity for phosphate, more so than arsenic or vanadium. Composition I, however, preferentially removed arsenic over vanadium in LW at pH 6.45.

The removal of bicarbonate was investigated at 1,000 bed volume run at LW pH 6.4 and 2 hours contact time. The results of this investigation are presented in Table 16.

TABLE 16

Removal of Bicarbonate. Initial Concentration = 190 ppm

| Media | Final Con. (ppm) | % Removal |
|---|---|---|
| I | 77 | 59.5 |
| E33 | 130 | 31.6 |

Although both medias removed significant amount of bicarbonate, composition I outperformed E33 in removing arsenic from Laytonville well water at pH 7.6 and 6.45. Composition I was also a very adsorbent for phosphate, vanadium and bicarbonate. The presence of these competing anions in higher concentrations than arsenic does not impede the ability of composition I to remove arsenic over 46,000 bed volumes.

EXAMPLE 10

Removal of Arsenic From City of Reno Nev. STIMGID Water

The objectives of this Example were to check the removal efficiency of I with and without pH adjustment, and to compare the performance of composition I and GFH in removing arsenic from STIMGID well water (RSW) is one of EPA test sites in Nevada. GFH was selected for comparison because it was the media selected after EPA performed an RSCCT. The testing protocol used for removing arsenic was SRSCCT (a jar test that simulate rapid small scale column testing).

Test Conditions

The initial pH of RSW was 7.4. The pH of RSW adjusted with HCl to 6.0-6.6. 0.25 ml of each media in 500 ml water was used to simulate 2,000 bed volumes per run. Contact time was 30 minutes per run, which is about 3.0 sec empty bed contact time.

TABLE 17

Reno STIMGID Water Quality

| Sustabce | Concentration (ppm) | Source |
|---|---|---|
| Total Alkalinity | 80 | CaCO3 |
| Bicarbonate | 98 | |
| Carbonate | <1.0 | |
| Chloride | 1.0 | |
| Fluoride | <0.1 | |
| Sulfate | 6.7 | |
| TDS | 190 | |
| Total Phosphous | N/A | |
| Antimony | 0.01 | |
| Arsenic | 0.045 | |
| Boron | 0.31 | |
| Calcium | 6.4 | |
| Silica | 60 | |
| Copper | N/A | |
| Iron | 0.053 | |
| Magnesium | 2.1 | |
| Manganese | <0.005 | |
| Vanadium | <0.01 | |
| Potassium | 4.7 | |

Figure 32:
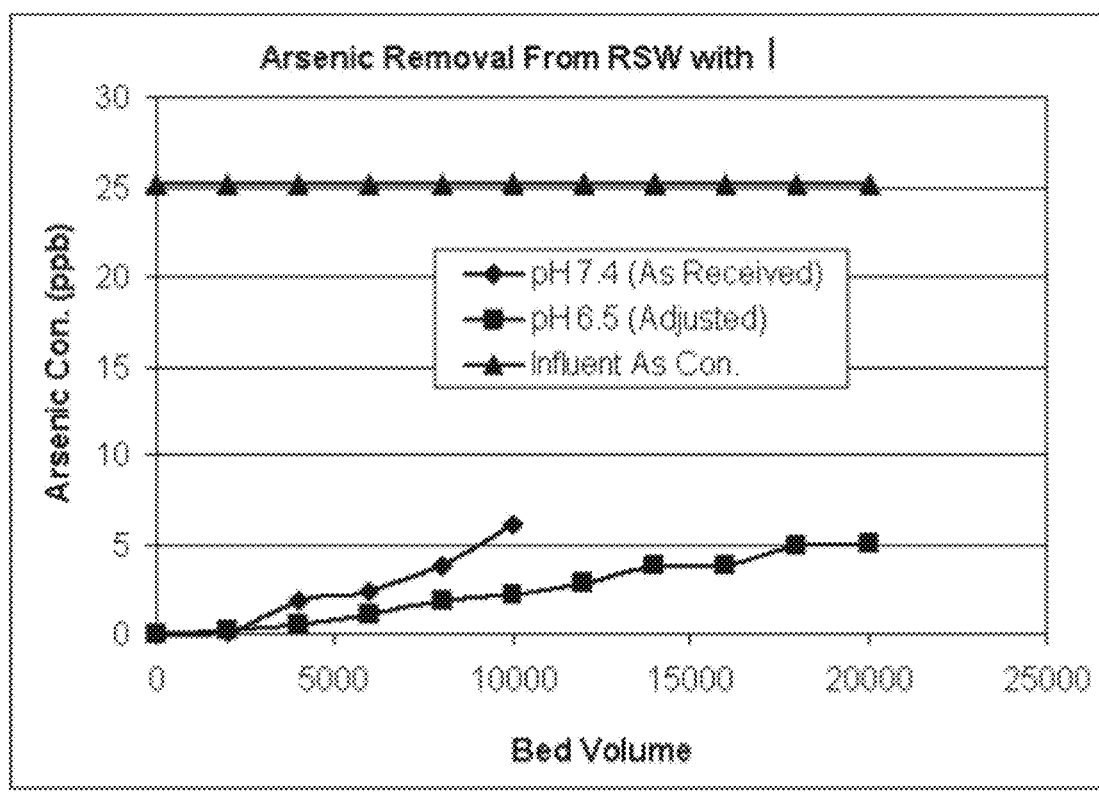
FIG. 32 is a graph of percent anion removal versus bed volumes of solution for a disclosed lanthanum-iron filtering composition I at various pH.
Figure 33:
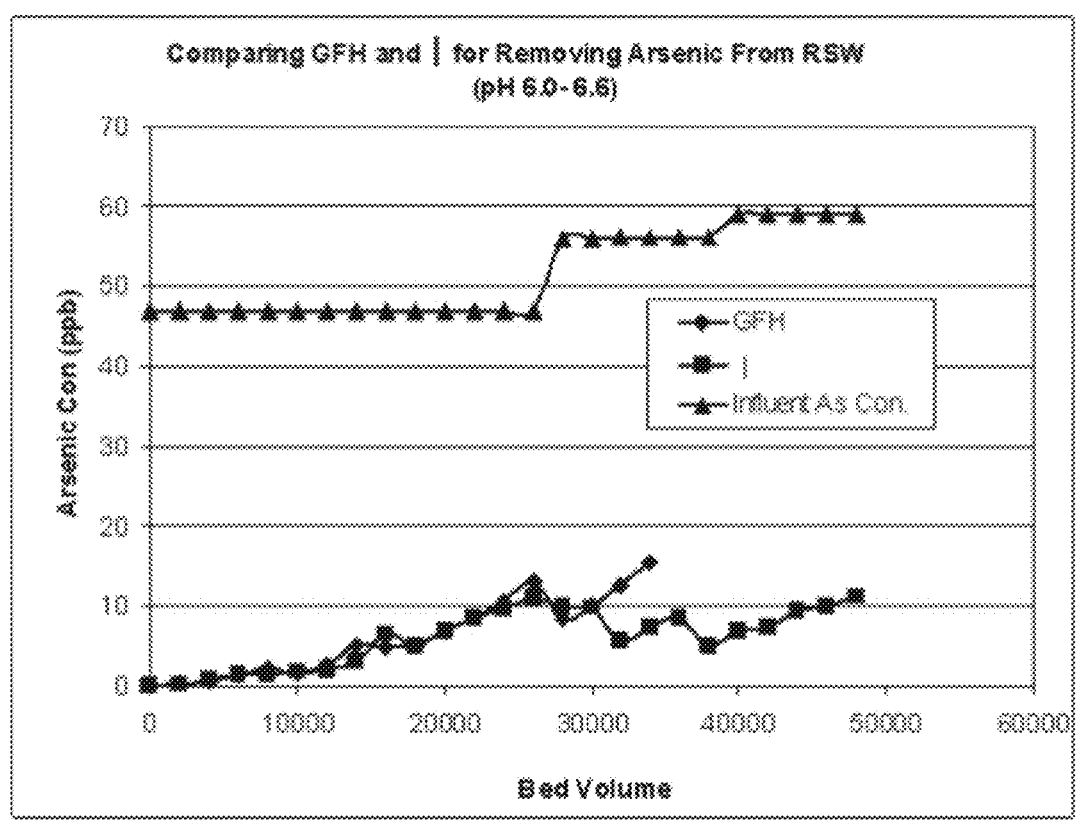
FIG. 33 is a graph of percent anion removal versus bed volumes of solution for a disclosed lanthanum-iron filtering composition I and a commercially available composition at pH 6.0-6.6.

Adsorption Results:

From the results presented in FIG. 32, composition I was more effective in arsenic removal at pH 6.5 than 7.4. Based on the pH results composition I and GFH were tested on RSW at pH range of 6.0-6.6. Results of this testing are presented in FIG. 33, which indicates that both GFH and composition I broke through at about 25,000 bed volumes when the influent pH of RSW was 6.6. Reducing the pH of the influent water below 6.6 resulted in further removal of arsenic with composition I to below 10.0 ppb. GFH, on the other hand, did not accomplish arsenic removal when the pH was adjusted to below 6.6.

The observed drops in effluent arsenic concentration are due to rest periods from both compositions. Final pH of effluent water after 46,000 bed volumes was about 6.6 for composition I, and about 6.7 for GFH.

EXAMPLE 11

Anion Removal

The presence of other anions in water could compete with anions of arsenic for adsorptive sites of composition I. The objective of this Example was to compare the preferential removal of some common competing anions.

Test Conditions

The anions selected were phosphate, fluoride, vanadium, sulfate, silica, and arsenate. De-ionized water at pHs 6.5 and 8.5 and equal molar concentration of the anions were used for testing. The anions were tested independently.

Results

Figure 34:
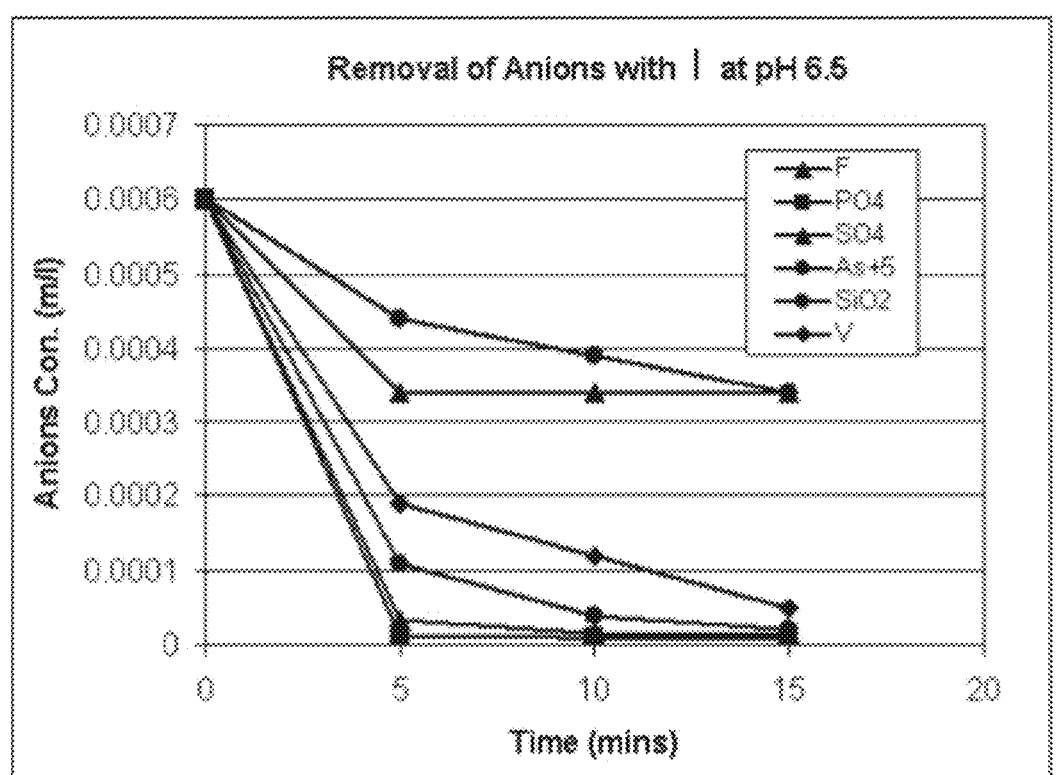
FIG. 34 is a graph of percent anion removal versus bed volumes of solution for a disclosed lanthanum-iron filtering composition I at pH 6.5.
Figure 35:
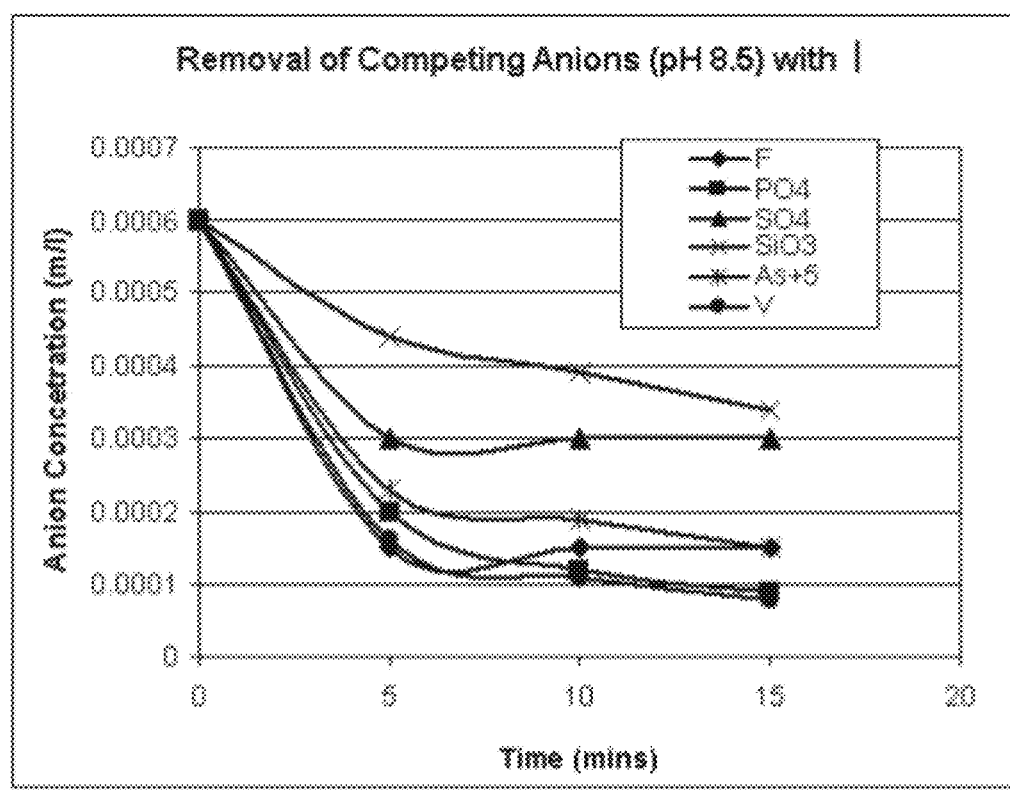
FIG. 35 is a graph of percent anion removal versus bed volumes of solution for a disclosed lanthanum-iron filtering composition I at pH 8.5.

The results presented in FIGS. 34 and 35 indicate that composition I removes most of these competing anions. The composition is more efficient in adsorbing these competing anions at pH 6.5 than 8.2. Composition I preferentially removes other anions in the following order: $PO_4>F>As>V>SO_4>SiO_2$ at pH 6.5; and $PO_4>F>V>As>SO_4>SiO_2$ at pH 8.5

It is to be understood that the above discussion provides a detailed description of various embodiments. The above descriptions will enable those skilled in the art to make many departures from the particular examples described above to provide apparatuses constructed in accordance with the present disclosure. The embodiments are illustrative, and not intended to limit the scope of the present disclosure. The scope of the present disclosure is rather to be determined by the scope of the claims as issued and equivalents thereto.

We claim:

1. A filtering composition comprising lanthanum and iron hydroxide, the filtering composition having a surface area of at least about 175 m²/g, wherein the filtering composition has a zeta point of at least about pH 9.0.

2. The filtering composition of claim 1, further comprising magnesium.

3. The filtering composition of claim 1, wherein the filtering composition has a surface area of at least about 200 m²/g.

4. The filtering composition of claim 1, wherein the filtering composition has a moisture content between about 10 wt % and about 40 wt %.

5. The filtering composition of claim 1, further comprising a cellulose support.

6. A method of forming the filtering composition of claim 1, comprising adding a solution comprising lanthanum and iron to a basic solution.

7. A method of forming the filtering composition of claim 1, the method comprising:
   precipitating an active agent comprising lanthanum and iron from a solution to produce the filtering composition; and
   drying the filtering composition at temperature less than about 200° C. until the filtering composition has moisture content between about 10 wt % and about 30 wt %.

8. The method of claim 7, further comprising ultrasonicating the filtering composition before drying the filtering composition.

9. The method of claim 8, wherein the filtering composition is ultrasonicated for between about 10 minutes and about 60 minutes.

10. The filtering composition of claim 1, the filtering composition having been manufactured by a process comprising:
   dissolving lanthanum nitrate and iron nitrate in a solution; and
   drying the solution at a temperature less than about 200° C. to yield precipitated lanthanum hydroxide and iron hydroxide.

11. The filtering composition of claim 10, wherein the process further comprises:
   after dissolving, heating the solution;
   stirring the solution and adding sodium hydroxide to adjust pH of the solution; and
   subjecting the solution to ultrasonic conditioning.

12. A filtering composition comprising lanthanum and iron oxy-hydroxide, the filtering composition having a surface area of at least about 175 m²/g, having a moisture content between about 10 wt % and about 30 wt %, and having a bulk density of between about 0.6 g/cc and about 1.0 g/cc.

13. The filtering composition of claim 12, further comprising magnesium.

14. The filtering composition of claim 12, wherein the filtering composition has a surface area of at least about 200 m²/g.

15. The filtering composition of claim 12, further comprising a diatomaceous earth support.

16. The filtering composition of claim 12, further comprising a cellulose support.

17. A filtering composition comprising lanthanum hydroxide and iron hydroxide, the filtering composition having a surface area of at least about 175 m²/g, having a zeta point of at least about pH 9.0, and having a bulk density of between about 0.6 g/cc and about 1.0 g/cc, the filtering composition having been manufactured by a process comprising:
   dissolving lanthanum nitrate and iron nitrate in a solution;
   heating the solution;
   stirring the solution and adding sodium hydroxide to adjust pH of the solution;
   subjecting the solution to ultrasonic conditioning; and
   drying the solution at a temperature less than about 200° C. to yield precipitated lanthanum hydroxide and iron hydroxide.

18. The filtering composition of claim 17, wherein the filtering composition has a surface area of at least about 200 m²/g.

19. The filtering composition of claim 1, wherein the zeta point is between about pH 9.0 and about pH 10.0.

20. The filtering composition of claim 1, further comprising a support, wherein the support is diatomaceous earth, perlite or cellulose.

21. A filtering composition comprising lanthanum hydroxide and at least one other metal, the filtering composition having a surface area of at least about 175 m²/g, having a bulk density of between about 0.5 g/cc and about 1.2 g/cc, and having a zeta point of at least about pH 9.0.

22. The filtering composition of claim 21, wherein the filtering composition has a bulk density of between about 0.6 g/cc and about 1.0 g/cc, and wherein the filtering composition has a zeta point of between about pH 9.0 and about pH 10.0.

23. The filtering composition of claim 21, wherein the filtering composition has a moisture content between about 10 wt % and about 40 wt %.

24. The filtering composition of claim 21 wherein the at least one other metal includes iron hydroxide.

25. The filtering composition of claim 21 wherein the at least one other metal includes iron oxy-hydroxide.

26. The filtering composition of claim 21 wherein the at least one other metal includes magnesium hydroxide.

27. The filtering composition of claim 21 wherein the at least one other metal includes magnesium oxide.

28. The filtering composition of claim 21, wherein the composition has a particle size of 20×200 mesh.

29. The filtering composition of claim 21, wherein the composition has a particle size of 100×325 mesh.

30. The filtering composition of claim 1, wherein the composition has a particle size of 20×200 mesh.

31. The filtering composition of claim 1, wherein the composition has a particle size of 100×325 mesh.

32. The filtering composition of claim 11, wherein the solution is heated to a temperature of between 35° C. and 45° C.

33. The filtering composition of claim 11, wherein the solution is heated to a temperature of up to about 60° C.

* * * * *